US012782707B2

(12) United States Patent
Greffet

(10) Patent No.: US 12,782,707 B2
(45) Date of Patent: Nov. 3, 2026

(54) OPTICAL MICROSCOPE WITH RESONATOR

(71) Applicant: UNVEIL, Verrières-le-Buisson (FR)

(72) Inventor: Jean-Jacques Greffet, Verrieres le Buisson (FR)

(73) Assignee: UNVEIL, Verrières-le-Buisson (FR)

( * ) Notice: Subject to any disclaimer, the term of this patent is extended or adjusted under 35 U.S.C. 154(b) by 0 days.

(21) Appl. No.: 19/112,831

(22) PCT Filed: Sep. 18, 2023

(86) PCT No.: PCT/EP2023/075685
§ 371 (c)(1),
(2) Date: Mar. 18, 2025

(87) PCT Pub. No.: WO2024/061843
PCT Pub. Date: Mar. 28, 2024

(65) Prior Publication Data

US 2026/0086343 A1 Mar. 26, 2026

(30) Foreign Application Priority Data

Sep. 19, 2022 (FR) ....................................... 2209431

(51) Int. Cl.
*G02B 21/36* (2006.01)
*G02B 21/08* (2006.01)
(Continued)

(52) U.S. Cl.
CPC ........... *G02B 21/367* (2013.01); *G02B 21/08* (2013.01); *G06T 5/50* (2013.01); *G06T 5/70* (2024.01);
(Continued)

(58) Field of Classification Search
CPC ........ G02B 21/367; G02B 21/08; G06T 5/70; G06T 5/50; G06T 2207/10056; G06T 2207/20221
(Continued)

(56) References Cited

U.S. PATENT DOCUMENTS 10,133,048 B2 * 11/2018 Carloni .............. G01N 15/1434
2005/0013529 A1 * 1/2005 Chiu .................. G02B 6/12007
385/39
(Continued)

FOREIGN PATENT DOCUMENTS

WO 2018011591 A1 1/2018

OTHER PUBLICATIONS

International Search Report and Written Opinion for International Application No. PCT/EP2023/075685, mailed Nov. 15, 2023, 12 pages.

*Primary Examiner* — Matthew David Kim
(74) *Attorney, Agent, or Firm* — Husch Blackwell LLP

(57) ABSTRACT

An optical microscope (200) comprising a light source (201) emitting illumination light (202), an optical device comprising a microscope objective (205), a resonator (212) placed between the optical device and the sample, comprising, successively in a direction of an optical axis of the microscope objective, a first layer having a first optical index, a spacer layer having a second optical index, and a waveguide layer having a third optical index, the second optical index being less than the first optical index and the third optical index, the resonator having a support surface facing away from the optical device and intended to receive the sample, and an optical detector (206), the optical device being arranged to collect light exiting the resonator, (Continued)

the outgoing light comprising light scattered (204) by the sample and a reflected non-scattered portion (215) of the illumination light.

18 Claims, 12 Drawing Sheets

(51) Int. Cl.
*G06T 5/50* (2006.01)
*G06T 5/70* (2024.01)

(52) U.S. Cl.
CPC ............... *G06T 2207/10056* (2013.01); *G06T 2207/20221* (2013.01)

(58) Field of Classification Search
USPC ............................................................ 348/79
See application file for complete search history.

(56) References Cited

U.S. PATENT DOCUMENTS

2007/0081246 A1* 4/2007 Stuck .................... B42D 25/29
359/568
2011/0176768 A1* 7/2011 Singh .................... G02B 5/285
385/36
2011/0285942 A1* 11/2011 Guo .................. G02F 1/133516
250/336.1
2011/0311962 A1* 12/2011 Zybin ................ G01N 15/1433
977/773
2014/0338074 A1* 11/2014 Aksyuk .................. G01Q 20/02
850/6
2020/0386619 A1* 12/2020 Kanamori ............. G01J 3/0259
2020/0393547 A1* 12/2020 Noda .................... G01S 7/4814
2021/0063717 A1* 3/2021 Valentine ............... G02B 1/002
2021/0080805 A1* 3/2021 Srinivasan ............ G02F 1/3501
2022/0011560 A1* 1/2022 Knowles ................ G01N 21/45
2022/0301738 A1* 9/2022 Blatt ........................ G04F 5/14

* cited by examiner

OPTICAL MICROSCOPE WITH RESONATOR

TECHNICAL FIELD

The disclosure relates to the field of optical microscopy. In particular, the disclosure relates to the field of detection and characterization of nanoparticles by optical microscopy. The disclosure can be used for detecting objects with a characteristic dimension ranging from 1 to 100 nm. Such objects include metal nanoparticles, nanoscale pollutants, and other objects of biological interest, such as proteins or peptides.

TECHNOLOGICAL BACKGROUND

A means of detecting nanoparticles involves labeling said particles, for example by fluorescent labeling. However, such a method quickly reaches its limitations, because the effect of fluorescent labeling is limited in time, thus restricting the duration of the observations. The quality of detection is also affected. In fact, the temporal resolution of the images is limited. In addition, fluorophores degrade rapidly over time. Finally, this technique is difficult to implement, since fluorescent labeling requires extensive upstream preparations.

Various optical microscopy techniques allow nanoparticles to be detected by elastic scattering without the need for pre-labeling, including dark-field techniques or interferometric techniques. Among the latter, the most common are the techniques iSCAT (interferential scattering), COBRi (coherent bright field), and IRIS (interferometric reflectance imaging sensor). They make it possible to currently see particles of 10 nm or less.

A central problem of interferometric techniques and dark-field techniques is that of the signal-to-noise ratio. In fact, their aim is to detect a signal of interest, which is a light that is elastically scattered by a nanoparticle. However, different types of noise affect the detection of the signal of interest.

In fact, there are many technical noises associated with fluctuations in the measurement system. Furthermore, an incident light source used in a microscope is subject to intensity fluctuations called photon noise, which are intrinsic to the physical process. In addition, the scattering of the illumination beam causes a random interference pattern called speckle noise.

Patent application WO 2018/011591 discloses an interferometric microscope of the iSCAT type in which a spatial filter makes it possible to attenuate the illumination beam in order to obtain an increase in the contrast of the image.

SUMMARY

A basic aim of the disclosure is to provide an optical microscope making it possible to improve a signal-to-noise ratio for individual detection of nanoparticles without labeling.

According to one embodiment, the disclosure provides an optical microscope comprising:

- a light source emitting illumination light adapted to illuminate a sample to be imaged,
- an optical device comprising a microscope objective,
- a resonator comprising, successively in a direction of an optical axis of the microscope objective, at least one first layer having a first optical index, at least one spacer layer having a second optical index, and at least one waveguide layer having a third optical index, the second optical index being less than the first optical index and the third optical index, the resonator having a support surface facing away from the optical device and intended to receive the sample,
- an optical detector, the optical device being arranged to collect light exiting the resonator and to direct the outgoing light from said resonator to the optical detector in order to form an image of the sample on the optical detector, the outgoing light comprising light scattered by the sample and a non-scattered portion of the illumination light With these features, several technical advantages are achieved:

- enhancing the effective scattering cross section of the particles, which amounts to enhancing the signal of interest collected by the optical detector,
- concentrating the light scattered by the sample into a very small solid angle, which allows efficient selective spatial filtering of the scattered light.

These effects make it possible to improve the signal-to-noise ratio. The enhancement of the effective scattering cross section increases the signal of interest collected by the optical detector. The concentration of the scattered light into a strongly limited solid angle allows the use, without loss of the signal of interest, of an attenuation filter for stray light that introduces noise into the measurement of the signal of interest.

In particular, according to one embodiment, the disclosure provides an optical microscope comprising:

- a light source emitting illumination light,
- an optical detector,
- an optical device comprising a microscope objective, the optical device receiving the illumination light in order to direct the illumination light onto a sample,
- a resonator placed between the optical device and the sample, the resonator comprising, successively in a direction of an optical axis of the microscope objective, at least one first layer having a first optical index, at least one spacer layer having a second optical index, and at least one waveguide layer having a third optical index, the second optical index being less than the first optical index and the third optical index, the resonator having a support surface facing away from the optical device and intended to receive the sample, the microscope objective being configured to direct the illumination light onto the resonator with an angle of incidence greater than a critical angle of an interface between the first layer and the spacer layer, in such a way that the illumination light resonantly excites at least one mode in the waveguide layer and illuminates the sample with an enhanced evanescent wave, the optical device being arranged to collect light exiting the resonator and to direct the outgoing light from the resonator to the optical detector in order to form an image of the sample on the optical detector, the outgoing light comprising light scattered by the sample and a reflected portion of the illumination light.

With these features, several technical advantages are achieved:

i) enhancing the intensity of illumination of the sample through resonant excitation of the waveguide, and thus enhancing the amount of light scattered by the particles contained in the sample. In fact, resonant excitation of one or more modes creates an accumulation of energy in the resonator, which leads to an enhancement of the field in the resonator as well as in its vicinity.

ii) enhancing the effective scattering cross section of the particles.
iii) creating an evanescent wave illumination intensity that is confined to the vicinity of the resonator-sample interface and is uniform in a plane parallel to said interface.
iv) concentrating the light scattered by the sample into a very small solid angle.

These effects make it possible to improve the signal-to-noise ratio.

In general, the light scattered by the sample corresponds to the light emitted from the sample and from the resonant plate that has interacted with the particles contained in the sample, and a non-scattered portion of the illumination light corresponds to the part of the illumination light present in the outgoing light beam without interaction with the particles.

The vicinity of the resonant plate corresponds to the thickness of the sample located less than a few hundred nanometers from the support surface of the resonant plate, for example at a distance of less than 200 nm from this support surface.

According to embodiments, an optical microscope as described above may comprise one or more of the following features.

According to one embodiment, the optical device comprises an amplitude filter arranged between the microscope objective and the optical detector, for example in the Fourier plane of the microscope objective or in an image plane of this plane, and configured to apply a first selective attenuation to the non-scattered portion of the illumination light.

Thus, scattered light represents a greater proportion of the intensity of the outgoing light detected by the optical detector. In other words, such filtering increases the ratio between the amplitude of the scattered field and the amplitude of the field not scattered by the sample.

Various techniques are available for producing such an amplitude filter, for example thin film deposition, in particular metal thin film deposition. The attenuation applied by the amplitude filter can be characterized by an intensity transmission coefficient. According to one embodiment, the intensity transmission coefficient associated with the first attenuation is between $10^{-1}$ and $10^{-6}$, preferably between $10^{-2}$ and $3.10^{-4}$. For example, an intensity transmission coefficient close to $10^{-3}$ is suitable for using, as detector, a camera with a well capacity of 10 k electrons, which is common.

According to one embodiment, the intensity transmission coefficient associated with the first attenuation is less than $10^{-6}$. By thus ensuring that the transmission of the reflected field is substantially zero, a dark-field configuration is obtained.

According to one embodiment, the light scattered by the sample consists of a first portion of scattered light from the resonantly excited mode(s) and a second portion of scattered light, the amplitude filter being further configured to apply a second selective attenuation to the second portion of scattered light. Such an amplitude filter makes it possible to select the light scattered around a particular angle corresponding to the radiative leaks of the guided mode or modes by attenuation of the rest of the scattered light. Thus, the field scattered via the guided modes is not attenuated and is transmitted to the optical detector. Such an amplitude filter can be used in a dark-field configuration or in a bright-field interferometric configuration.

According to one embodiment, the intensity transmission coefficient associated with the second attenuation is between $10^{-1}$ and $10^{-6}$.

According to one embodiment, the intensity transmission coefficient associated with the second attenuation is less than $10^{-6}$.

According to an embodiment in a dark-field configuration, the intensity transmission coefficient associated with the first attenuation and the intensity transmission coefficient associated with the second attenuation are less than $10^{-6}$. Thus, the amplitude filter is configured to apply a total attenuation to the reflected field and to the field scattered by the sample except around a particular angle corresponding to the radiative leaks of the guided mode(s).

According to an embodiment in an interference configuration, the amplitude filter is configured to apply a first selective attenuation to the non-scattered portion of the illumination light and a second selective attenuation to the second portion of scattered light. Preferably in this case, the intensity transmission coefficient associated with the first attenuation is greater than the intensity transmission coefficient associated with the second attenuation. For example, the intensity transmission coefficient associated with the first attenuation is between $10^{-1}$ and $10^{-6}$ and the intensity transmission coefficient associated with the second attenuation is between $10^{-1}$ and $10^{-6}$.

According to one embodiment, the optical device comprises two convergent lenses arranged to image a Fourier plane of the microscope objective on said amplitude filter.

Thus, the amplitude filter can attenuate the non-scattered portion of the illumination light, a position of said non-scattered portion of the illumination light being known in the Fourier plane. This attenuation can be precisely selective.

According to one embodiment, the illumination light is a light beam, in particular a laser beam.

Thus, the illumination light is coherent and can be monochromatic.

According to one embodiment, the illumination light is emitted by a light-emitting diode (LED).

According to one embodiment, the illumination light is monochromatic and has a wavelength of between 400 nanometers and 1300 nanometers, preferably between 450 and 532 nanometers.

According to one embodiment, the resonator further comprises at least one partially reflecting mirror.

According to one embodiment, the mirror is a Bragg mirror. In particular, it is a partially reflecting mirror.

According to one embodiment, the resonator comprises a plurality of spacers and a plurality of waveguides, each spacer of the plurality of spacers being placed in contact with at least one of the plurality of waveguides.

According to one embodiment, at least two first spacers of the plurality of spacers have different thicknesses. Suitable thicknesses may typically be between 100 nm and 1 μm.

According to one embodiment, at least two second spacers of the plurality of spacers are made of different materials.

According to one embodiment, at least one spacer of the plurality of spacers is composed of magnesium fluoride.

According to one embodiment, at least two first waveguides of the plurality of waveguides have different thicknesses. Suitable thicknesses may typically be between 10 and 500 nm.

According to one embodiment, at least two second waveguides of the plurality of waveguides are composed of different materials.

According to one embodiment, at least one waveguide of the plurality of waveguides is made of titanium dioxide.

According to one embodiment, a resonant mode of the resonator is a surface wave.

According to one embodiment, the optical device comprises at least one convergent lens traversed by the outgoing light, the convergent lens being configured to image an object plane of the microscope objective on said optical detector.

According to one embodiment, the microscope comprises or is connected to an image processing system, the image processing system being configured to:

record a plurality of images detected by the optical detector at successive times, combine the plurality of images into a reference image, for example, each pixel of the reference image being able to be calculated as the mean value or median value of corresponding pixels of the plurality of images, process at least one image detected by the optical detector with the reference image so as to suppress static signals.

To do this, it is possible to subtract the reference image from the or each detected image. This produces an image or images where only dynamic signals remain in time, not static signals. Thus, all of the static noises can be filtered.

According to one embodiment, the image processing system is configured to apply a convolution filter to at least one image detected by the optical detector.

According to one embodiment, the convolution filter is a Gaussian filter. According to one embodiment, the optical microscope comprises or is connected to an image processing system, the image processing system being configured to:

determine a contrast in an image detected by the optical detector, determine at least one parameter of a particle contained in the sample as a function of said contrast, said parameter being selected from the group consisting of a mass of the particle and a position of the particle in the direction of the optical axis.

According to one embodiment, the optical detector may be a digital camera.

According to one embodiment, the light source and the optical device are arranged to illuminate the sample received by the support surface of the resonator in reflection.

According to one embodiment, the optical device receives the illumination light in order to direct the illumination light onto the sample, the microscope objective of the optical device being configured to direct illumination light onto the resonator with an angle of incidence greater than a critical angle of an interface between the first layer and the spacer layer, in such a way that the illumination light resonantly excites at least one mode in the waveguide layer and illuminates the sample with an enhanced evanescent wave.

According to one embodiment, the portion of the outgoing light not scattered by the sample is a reflected portion of the illumination light.

According to one embodiment, the optical device comprises a polarizing or non-polarizing beam splitter plate, the polarizing or non-polarizing beam splitter plate reflecting the illumination light in the direction of the microscope objective and being traversed by the outgoing light.

According to one embodiment, the optical detector is a first optical detector, the optical microscope comprising a second optical detector, the optical device comprising a non-polarizing beam splitter plate, the non-polarizing beam splitter plate receiving the outgoing light and splitting the outgoing light into a first portion of outgoing light directed to the first detector and a second portion of outgoing light directed to the second detector, the first portion of outgoing light comprising a first portion of reflected light and a first portion of scattered light, a phase mask being arranged to be traversed by the first portion of outgoing light, the phase mask being configured to apply a phase shift between the first portion of reflected light and the first portion of scattered light.

Thus, a difference in light intensity can be measured between the first optical detector and the second optical detector.

According to one embodiment, the phase mask is a first phase mask, the optical device further comprising a second phase mask arranged to be traversed by the second portion of outgoing light, the second portion of outgoing light having a second portion of reflected light and a second portion of scattered light, the second phase mask being configured to apply a phase shift between the second portion of reflected light and the second portion of scattered light, the first phase mask and the second phase mask having different phase properties.

Thus, a phase shift between the first phase mask and the second phase mask can be configured to minimize background noise and maximize contrast by subtracting the two images.

According to one embodiment, the optical device comprises an optical condenser receiving the illumination light exiting the light source, the optical condenser being configured to focus illumination light in a Fourier plane of the microscope objective onto a zone remote from the optical axis of the microscope objective in order to produce said angle of incidence.

Thus, said angle of incidence can be chosen to exceed the critical angle on an interface of the resonator.

According to one embodiment, the resonator is arranged between the microscope objective and the light source along the optical axis of said microscope objective, so that the light source is adapted to illuminate the sample received by the support surface of the resonator in transmission.

According to one embodiment, the light source is arranged to emit an incident light beam illuminating the support surface of the resonator at normal incidence.

BRIEF DESCRIPTION OF THE FIGURES

The disclosure will be better understood, and other aims, details, features and advantages thereof will become more clearly apparent in the course of the following description of several particular embodiments of the disclosure, which are given solely by way of illustration and without limitation, with reference to the appended drawings.

DETAILED DESCRIPTION

Embodiments of an optical microscope equipped with a resonator allowing high-performance detection of the light scattered by very small objects will be described below. For this purpose, with reference to FIG. 1, concepts of optical microscopy useful for understanding the disclosure are first discussed.

Figure 1:
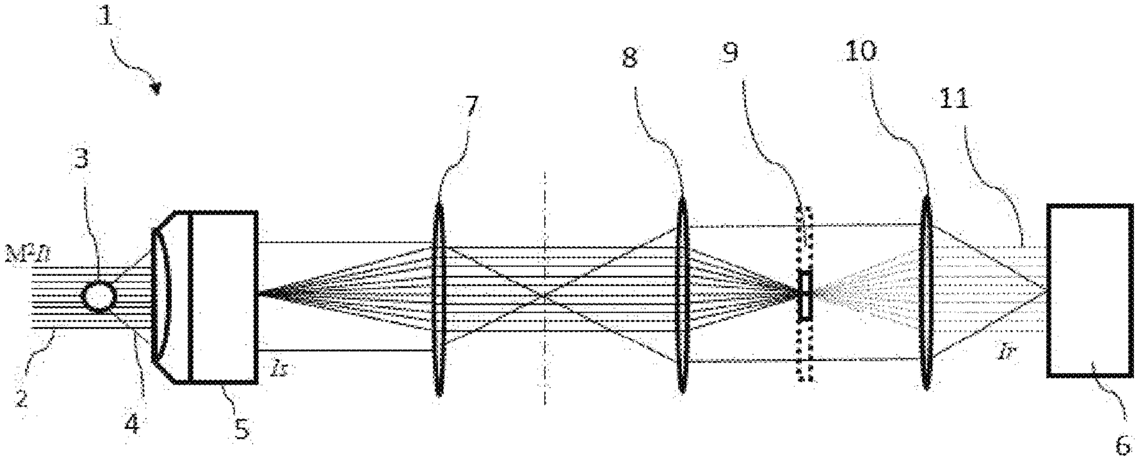
FIG. 1 shows an example of an optical microscope in transmission.

FIG. 1 shows an example of a transmission microscope 1. The transmission microscope 1 comprises a light source (not shown) emitting an incident light beam 2 having an incident intensity $I'_i=M^2I_i$. By convention, the incident intensity $I_i$ is defined in the image plane of the camera 9 and differs by a factor $M^2$ from the intensity $I'_i$ of the incident light beam 2 defined in the plane of the particle, where Mdenotes the magnification of the microscope. A nanoparticle 3 is illuminated by the incident light beam 2. Illumination of the incident light beam 2 on the nanoparticle 3 is the source of scattered light 4 having a scattering intensity $I_S$ in the image plane of the camera.

The transmission microscope 1 comprises a microscope objective 5, an optical device and a camera 6. The optical device comprises two convergent lenses 7 and 8 forming a mount 4-*f*, a spatial filter 9 and a tube lens 10. The mount 4-*f* allows the Fourier plane of the microscope objective 5 to be projected onto the spatial filter 9.

The objective 5, the optical device and the camera 6 have a common optical axis. The incident light beam 2 is parallel to the common optical axis. The incident light beam 2 and the scattered light 4 pass through the objective 5 and the optical device before being imaged on the camera 6.

The camera 6 receives a final signal which is a superposition of the incident light beam 2 and the scattered light 4. The final signal may comprise an interference term due to a phase shift Δθ between the incident light beam and the scattered light.

A detected intensity of the final signal is expressed:

$$\begin{aligned} I_{det} &= I_i + I_s + 2\sqrt{I_i I_s}\cos(\Delta\theta) \\ &= I_i\left(1 + \left(\frac{I_s}{I_i}\right) + 2\sqrt{\frac{I_s}{I_i}}\cos(\Delta\theta)\right) \end{aligned}$$

The nanoparticle 3 has an effective scattering cross section a, which is proportional to the square of its volume. In addition, the camera 6 receives a fraction of collected scattered energy $f_{col}$. The transmission microscope 1 has a magnification M. Thus, a power scattered to a pixel of the camera is written:

$$P_s = f_{col}\sigma I'_i = f_{col}\sigma M^2 I_i$$

Moreover, the scattered power is distributed at the level of a surface S of an Airy spot corresponding to an image of the nanoparticle 3 on the camera 6. The scattered power can therefore also be expressed:

$$P_s = SI_S$$

This makes it possible to reformulate the expression of the detected intensity as a function of the effective scattering cross section σ, the fraction of scattered energy collected $f_{col}$, and the magnification M:

$$I_{det} = I_i\left(1 + \frac{M^2 f_{col}\sigma}{S} + 2M\sqrt{\frac{f_{col}\sigma}{S}}\cos(\Delta\theta)\right)$$

According to a quantitative example, the physical quantities have the following values:

a wavelength of the incident light beam 2 is 450 nanometers, and the nanoparticle 3 has a diameter of 3 nanometers. An optical index of the nanoparticle 3 is 1.5, and the nanoparticle 3 is suspended in water, an optical index of the water being 1.33. The effective scattering cross section is therefore 7.8 $10^{-14}$ μm$^2$.

The magnification M is 100.

A radius of the Airy spot can be 400 nm in the image plane of the objective 5, i.e. 40 μm in the image plane of the camera 9. The surface area of the Airy spot is then 5000 μm$^2$ in the image plane of the camera 9. The microscope objective 5 can be an oil microscope and have a numerical aperture of 1.45. The collection factor can then be 42%. In this case, the following numerical value is obtained:

$$\frac{f_{col}\sigma}{S} = 6.5\ 10^{-18}$$

The transmission microscope 1 can be used in an interferential (or bright-field) configuration or in a dark-field configuration. When the transmission factor of the attenuator placed at the center (spatial filter 9) is zero, the microscope is in dark-field configuration. Schematically, when this transmission factor is non-zero, the microscope is in interferential configuration. In fact, a dark-field configuration is obtained as soon as the interferometric term is negligible compared to the direct scattering term of the nanoparticle.

In interferential configuration, the camera 6 receives both the incident light beam 2 and the scattered light 4, which interfere.

As is shown in FIG. 1, the incident light beam 2 can be attenuated to a greater or lesser extent by the spatial filter 9. In dark-field configuration, the transmission factor of the spatial filter 9 is zero.

The tube lens 7 is configured to focus the scattered light 4 into an object focal plane of the intermediate convergent lens 8.

The spatial filter 9 comprises a mask placed on the common optical axis. The tube lens 7 and the intermediate convergent lens 8 focus the incident light beam 2 onto the mask of the spatial filter, the spatial filter 9 being positioned at a focal distance from the intermediate convergent lens 8.

The spatial filter 9 allows a filtered beam 11 to pass. The camera therefore receives the scattered light 4 and the filtered beam 11, the scattered light 4 passing through the last convergent lens 10 and being focused on the camera 6, in an image focal plane of the last convergent lens 10.

In dark-field configuration, the incident intensity reaching the camera is zero and the detected intensity is expressed:

$$I_{det} = I_i\left(\frac{f_{col}\sigma M^2}{S}\right)$$

For a magnification value M of 100, the detected intensity is 6.5 $10^{-14}$ $I_i$.

An average number N of photons detected by a pixel of area S' over a period of time τ is $I_{det}S'T$. Considering photon noise (or shot noise) as a main noise source and expressing intensity in number of photons per second and per unit area, a signal-to-noise ratio is then expressed:

$$SNR = \frac{I_{det}S'\tau}{\sqrt{I_{det}S'\tau}} = M\sqrt{I_iS'\tau\left(\frac{f_{col}\sigma}{S}\right)}$$

For an area S' of 100 $\mu m^2$ and an incident intensity of $10^{10}$ $s^{-1}$ $\mu m^{-2}$, the signal-to-noise ratio is then given by: 100 $[10^{12}$ 6 $10^{-18}$ $\tau]^{1/2}$=0.2τ

The signal-to-noise ratio becomes greater than 1 if an average over ten pixels is performed for an acquisition time of one second. However, there is a background noise which is in practice greater than the 3 nm particle signal. It is difficult to detect particles smaller than 10 nanometers in diameter. An increase in the signal-to-noise ratio is therefore a crucial problem.

For a bright-field interferometric microscope, the detected intensity is expressed:

$$I_{det} = I_i\left(1 + 2M\sqrt{\frac{f_{col}\sigma}{S}}\cos(\Delta\theta)\right)$$

The signal-to-noise ratio can then be expressed:

$$SNR = \frac{2M\ I_iS'\tau\sqrt{\frac{f_{col}\sigma}{S}}\cos(\Delta\theta)}{\sqrt{I_iS'\tau}} - 2M\sqrt{I_iS'\tau\left(\frac{f_{col}\sigma}{S}\right)}$$

The signal-to-noise ratio is then twice as high as in dark-field configuration. On the other hand, the signal to be measured is considerably greater in interferometric configuration. The difference can be characterized by introducing the contrast c defined by:

$$c = M\sqrt{\frac{f_{col}\sigma}{S}}.$$

We can then write that the detector records a signal:

$$I_{det} = I_i(1 + 2c\ \cos(\Delta\theta))$$

In interferometric configuration, the amplitude of the signal is thus 2 c $I_i$, while it is $c^2$ $I_I$ in dark-field configuration.

The intensity detected in interferometric configuration is higher, which makes it possible to go above the background noise limiting the detection in dark-field configuration. In addition, this allows faster collection of the electrons on a pixel of the camera, and therefore faster acquisition.

However, the spatial fluctuations of the incident intensity $I_I$ (speckle fluctuations) are much greater than the signal and must be subtracted. It is then necessary to have a detector that can perceive very small variations of the signal in order to distinguish the background noise from a useful signal. The problem concerning signal-to-noise improvement is therefore also important in bright-field configuration.

FIGS. 2, 3, 14 and 19 show four embodiments of an optical microscope 100, 200, 700, 800 comprising:

- a light source 101, 201, 701, 801 emitting illumination light adapted to illuminate a sample 133, 233, 733, 833 to be imaged,
- an optical device comprising a microscope objective 105, 205, 705, 805,
- a resonator comprising, successively in a direction of an optical axis of the microscope objective, at least one first layer 241, 541, 641 having a first optical index, at least one spacer layer 242, 542, 642 having a second optical index, and at least one waveguide layer 243, 543, 643 having a third optical index, the second optical index being less than the first optical index and the third optical index, the resonator having a support surface facing away from the optical device and intended to receive the sample 133, 233, 733, 833,
- an optical detector 106, 206, 706, 716, 806, the optical device being arranged to collect light exiting the resonator and to direct the outgoing light from said resonator to the optical detector in order to form an image of the sample 133, 233, 733, 833 on the optical detector 106, 206, 706, 716, 806, the outgoing light comprising light 104, 204, 504, 604, 704, 804 scattered by the sample and a non-scattered portion 115, 215, 715, 815 of the illumination light.

The resonator is in practice in the form of a resonant plate 112; 212, 512, 612, 712, 812.

In the first, second and third embodiments of the optical microscope 100, 200, 700, the light source 101, 201, 701 and the optical device are arranged to illuminate the sample 133, 233, 733 received by the support surface of the resonator 112, 212, 712 in reflection. For this purpose, the sample receives an incident light beam emitted by the light source, after its passage through the resonant plate 112, 212, 712, as will be described in greater detail later. In this configuration, the support surface of the resonant plate is oriented away from the light source.

To this end, the optical microscope 100, 200, 700 comprises a polarizing splitter beam plate 114, 214, 714 arranged on the optical axis of the microscope objective 105, 205, 705 and arranged to reflect at least part of the illumination light emitted by the light source 101, 201, 701 in the direction of the resonant plate 112, 212, 712. In a variant, the beam splitter plate can also be non-polarizing.

In this reflection configuration, the incident light beam penetrates the resonant plate via a lower face of the resonant plate, opposite the support surface adapted to receive the sample 133, 233, 733. This support surface will be referred to hereinafter as the upper surface of the resonant plate 112, 212, 712.

In general, in the reflection configuration of the first, second and third embodiments, the incident light beam emitted by the light source propagates along an optical path which first passes through a convergent entrance lens 107, 207, 761. After passing through the convergent entrance lens 107, 207, 761, the incident light beam is partially reflected by the polarizing beam splitter plate 114, 214, 714 and passed through the microscope objective 105, 205, 705 and then through the resonant plate 112, 212, 712 to the sample 133, 233, 733 received by the support surface of the resonant plate.

After interaction between the sample 133, 233, 733 and the incident light beam, an outgoing light beam is emitted and exits the resonant plate 112, 212, 712. This outgoing light beam passes through the microscope objective 105, 205, 705 and is transmitted by the polarizing beam splitter plate 114, 214, 714. It propagates through a convergent exit lens 108, 208, 762. It comprises the light 104, 204, 504, 604, 704 scattered by the sample 133, 233, 733 and a non-scattered portion 115, 215, 715 of the illumination light. When the optical microscope is used with reflection illumination, the non-scattered portion 115, 215, 715 corresponds to a part of the incident light beam that is reflected at the interface between the resonant plate 112, 212, 712 and the sample, without interaction with the sample 133, 233, 733. In this configuration, the non-scattered portion 115, 215, 715 is therefore a reflected portion of the incident light beam.

The fact that the incident light beam passes through the resonant plate 112, 212, 712 before penetrating the sample makes it possible to enhance the intensity of illumination of the sample by virtue of the resonant excitation of the waveguide and thus to enhance the quantity of light scattered by the particles placed in the vicinity of the resonant plate.

Furthermore, an evanescent wave illumination intensity is confined to the vicinity of the interface between the resonator and the sample and is uniform in a plane parallel to this interface. The illumination is thus confined to a small thickness. This avoids the noise brought about by the light scattered by the particles distant from the interface in the case of non-confined illumination.

The resonant plate 112, 212, 712 enhances the effective scattering cross section of the particles in its vicinity.

Furthermore, the resonant plate 112, 212, 712 modifies the radiation pattern of the particles in its vicinity and concentrates their scattered light in a very small solid angle. Selective collection of the light scattered by the sample is thus facilitated, and the signal-to-noise ratio can be easily increased by spatial filtering, as is described in more detail below.

Figure 19:
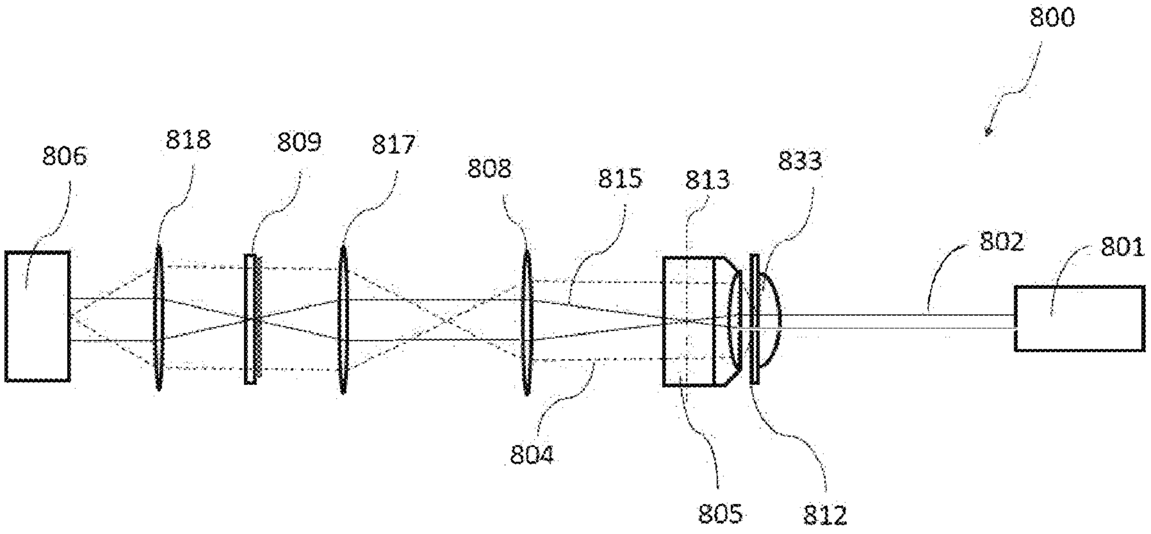
FIG. 19 shows an optical microscope in transmission, comprising a resonant plate according to a fourth embodiment.

In the fourth embodiment of the optical microscope 800 shown in FIG. 19, the light source 801 and the optical device are arranged to illuminate the sample 833 received by the support surface of the resonator 812 in transmission. Here, the sample directly receives an incident light beam as emitted by the light source 801, without the beam having interacted with any other optical element. The incident light beam 802 propagates at normal incidence with respect to the support surface of the resonant plate. The sample 833 is thus preferably illuminated under normal incidence. In this case, no optical element is arranged on the optical path of the incident light beam between the light source 801 and the resonant plate 812. The support surface of the resonant plate 812 is oriented toward the light source 801.

In this transmission configuration, the incident light beam penetrates the sample placed on the support surface of the resonant plate 812 without having passed through the resonant plate 812. The incident light beam 802 passes through the entire thickness of the sample 833 and then through the resonant plate 812.

The outgoing light beam is emitted and exits the resonant plate 812. It passes through the microscope objective 805 and propagates through a convergent exit lens 808, as in the optical microscope operating in reflection.

The outgoing light beam comprises the light 804 scattered by the sample 833 and a non-scattered portion 815 of the illumination light. When the optical microscope is used with transmission illumination, the non-scattered portion 815 corresponds to a part of the incident light beam that is transmitted through the sample, without interaction with the particles contained in the sample 833.

The resonant plate 812 enhances the effective scattering cross section of the particles situated in its vicinity In addition, the coupling of the light scattered by the sample with the resonant plate 812 concentrates the light scattered by the sample in a very small solid angle. Selective collection of the light scattered by the sample is thus facilitated, and the signal-to-noise ratio can be increased by filtering.

Each of the embodiments shown in the appended figures will now be described in greater detail.

Figure 2:
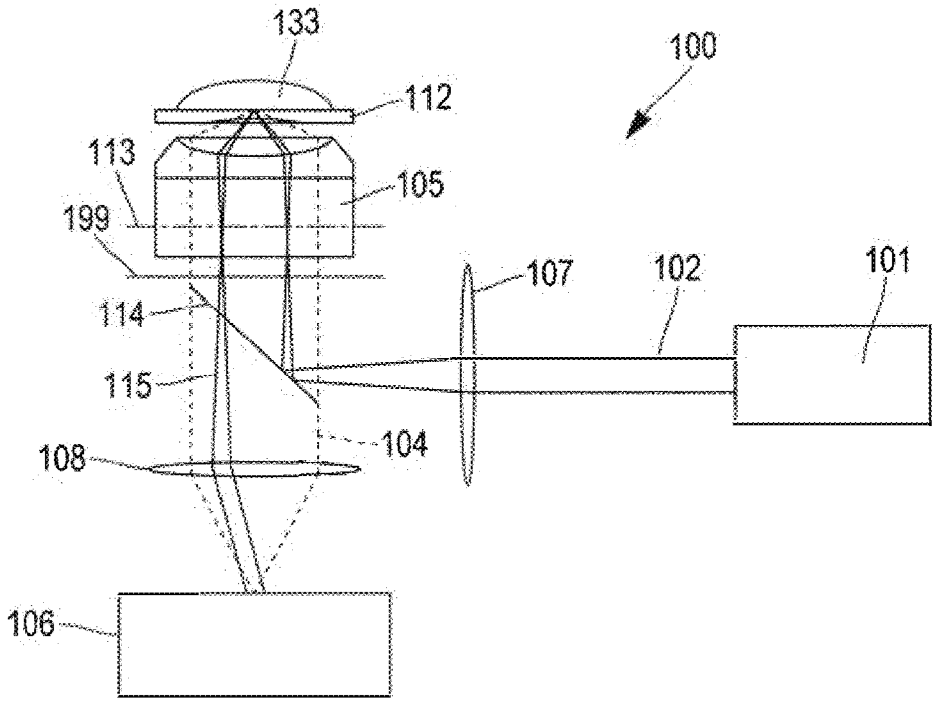
FIG. 2 shows an optical microscope in reflection according to a first embodiment comprising a resonant plate.

FIG. 2 shows the first embodiment of the optical microscope 100, operating in reflection and comprising a resonant plate 112 intended to be brought into contact with a sample 133 comprising one or more nanoparticles suspended in a solution. The nanoparticle can have a diameter of between 1 nanometer and 100 nanometers.

In practice, the sample 133 can rest, under the effect of its own weight, on an upper surface of the resonant plate 112. The resonant plate 112 is arranged horizontally. It will be appreciated that there may be other configurations where the placement of the sample in contact with the resonant plate 112 is ensured by other means.

The optical microscope 100 further comprises the light source 101, the microscope objective 105 and the detector 106.

Here, the light source 101 is a laser source, and the incident light beam is an incident laser beam 102. The light source 101 is arranged so as to emit this incident laser beam

102 having, for example, a wavelength of between 400 nanometers and 1300 nanometers.

The incident laser beam 102 can be a wide beam illuminating an extensive zone of the sample 133, or a focused narrow beam which scans the zone of interest of the sample 133.

The optical microscope 100 further comprises the optical device comprising the convergent entrance lens, which will be referred to here as the first convergent lens 107, the convergent exit lens, referred to hereinafter as the second convergent lens 108, and the polarizing beam splitter plate 114.

The incident laser beam 102 passes through the first convergent lens 107 and is reflected by the polarizing beam splitter plate 114. The first convergent lens 107 can be an optical condenser. The polarizing beam splitter plate 114 has a semi-reflecting surface positioned so that an incident angle of the incident laser beam 102 on the polarizing beam splitter plate 114 is 45°. According to one embodiment, the incident angle of the incident laser beam 102 on the polarizing beam splitter plate 114 may have a different value. The polarizing beam splitter plate 114 reflects a polarization component of the incident laser beam 102 but allows another polarization component of the incident laser beam 102 to pass in transmission.

The incident laser beam 102 is reflected on the polarizing beam splitter plate 114 and is then directed toward the microscope objective 105. The microscope objective 105 can be an immersion objective, comprising an immersion oil having a refractive index identical to a refractive index of glass. The microscope objective 105 has a numerical aperture adapted to produce the excitation of a resonant mode as described below.

The optical microscope 100 is further configured such that the incident laser beam 102 is focused eccentrically with respect to a middle of the optical axis of the microscope objective 105. Thus, a distance from the optical axis in the Fourier plane 113 makes it possible to control an inclination of the incident laser beam 102 on the sample 133.

Thus, at the output of the microscope objective 105, the incident laser beam 102 illuminates a surface of the sample 133 with a predefined angle of incidence controlled by parameters of the optical microscope 100.

The incident laser beam 102 passes through a delay plate 199 and then the objective 105 and illuminates the resonant plate 112. The delay plate 199 introduces a phase difference between two polarization components of the beam transmitted by this delay plate. A reflected laser beam 115 and a scattered beam 104 are emitted from the resonant plate 112. The reflected laser beam 115 and the scattered beam 104 constitute the outgoing light beam. The reflected laser beam 115 is a reflection of the incident laser beam 102 on the zone of interest. The scattered beam 104 propagates over a wider range of angles than the reflected laser beam 115.

The scattered beam 104 and the reflected laser beam 115 pass through the objective 105 and then through the polarizing beam splitter plate 114. The scattered beam 104 and the reflected laser beam 115 pass through the second convergent lens 108 and are imaged on the detector 106.

The second convergent lens 108 can be a tube lens. A sensitive surface of the detector 106 can be placed at a focal length of the second convergent lens 108.

The detector 106 can be a photographic sensor, for example of the CMOS or CCD type. Sensors limited to 10000 electrons per pixel may in particular be used. The detector 106 can also comprise a memory in order to record several successive images.

Figure 3:
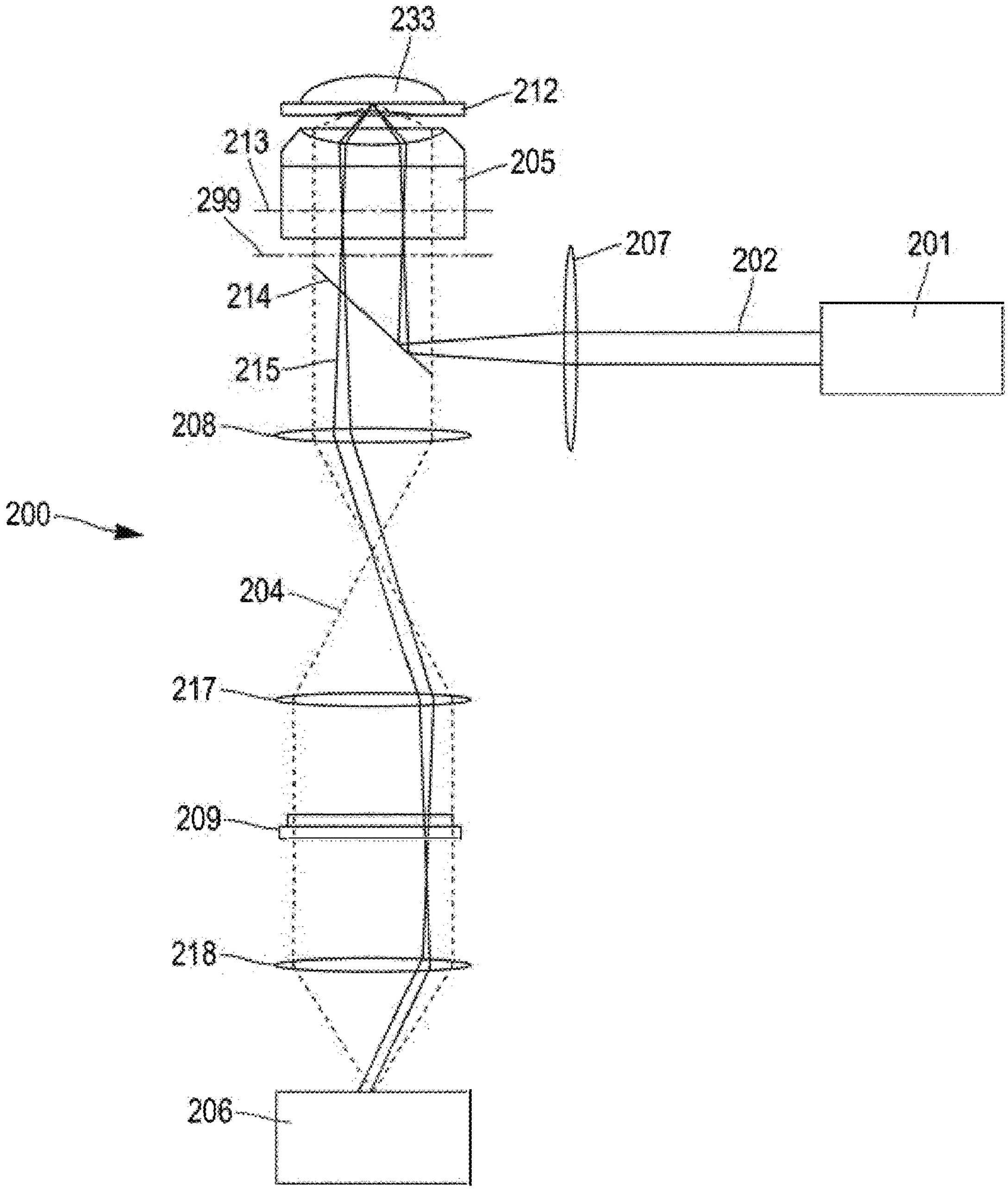
FIG. 3 shows the optical microscope in reflection according to a second embodiment comprising the resonant plate.

With reference to FIG. 3, a second embodiment is presented. The incident light beam is here, for example, an incident laser beam 202. The incident laser beam 202 emitted by the light source 201 passes through the convergent entrance lens, referred to here as the initial convergent lens 207, and is then reflected on the polarizing beam splitter plate 214. The incident laser beam 202 is then reflected in the direction of the microscope objective 205.

According to the second embodiment, the incident laser beam 202 is focused on a position eccentric from a center of the polarizing beam splitter plate 214. The incident laser beam 202 is then reflected in the direction of the microscope objective.

The incident laser beam 202 passes through a delay plate 299 which, according to one embodiment, is a quarter-wave plate.

The incident laser beam 202 is focused on a Fourier plane 213 of the microscope objective 205.

The optical microscope 200 is further configured such that the incident laser beam 202 is focused eccentrically with respect to a center of the optical axis of the microscope objective 205. Thus, a distance from the optical axis in the Fourier plane 213 makes it possible to control an inclination of the incident laser beam 202 on the sample 233.

Thus, at the output of the microscope objective 205, the incident laser beam 202 illuminates a surface of the sample 233 with a predefined angle of incidence controlled by parameters of the optical microscope 200.

The resonant plate 212 sends back a reflected laser beam 215 and a scattered light 204 emitted by the sample. Here, the outgoing light beam is thus composed of the reflected laser beam 215 and the scattered light 204. The reflected laser beam 215 and the scattered light 204 pass through the microscope objective 205. The reflected laser beam 215 is also focused on the Fourier plane 213 of the microscope objective 205, in another eccentric position.

The scattered light 204 and the reflected laser beam 215 pass through the polarizing beam splitter plate 214 and then pass through the convergent exit lens, which here constitutes a first convergent exit lens 208, a second convergent exit lens 217, a spatial filter 209 and a third convergent exit lens 218 before being imaged on a camera 206.

An image focal plane of the first convergent exit lens 208 corresponds to an object focal plane of the second convergent exit lens 217. The spatial filter 209 is placed in an image focal plane of the second convergent exit lens 217. Thus, the reflected laser beam 215 is focused on the spatial filter 209.

The third convergent exit lens 218 focuses the reflected laser beam 215 and the scattered light 204 onto the sensitive surface of the camera 206, which is placed in an image focal plane of the third convergent exit lens 218.

Figure 4:
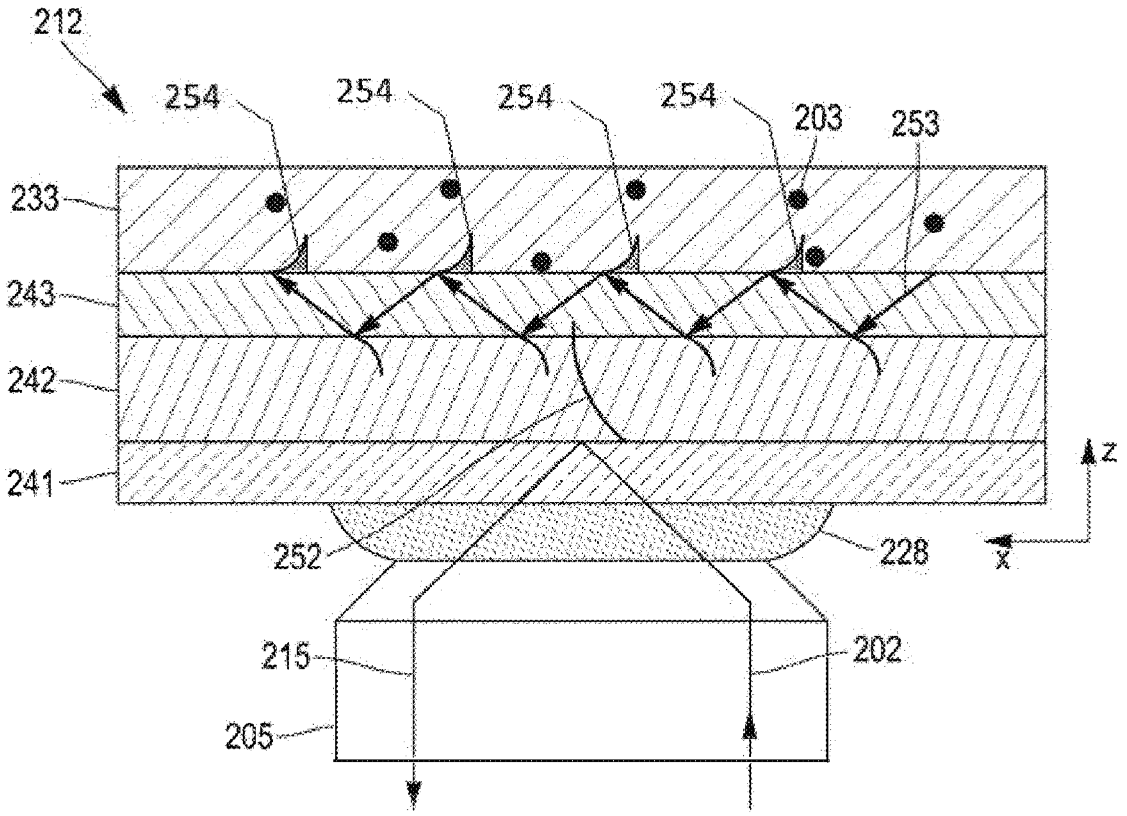
FIG. 4 shows a microscope objective and the resonant plate of the optical microscope of FIG. 2.
Figure 5:
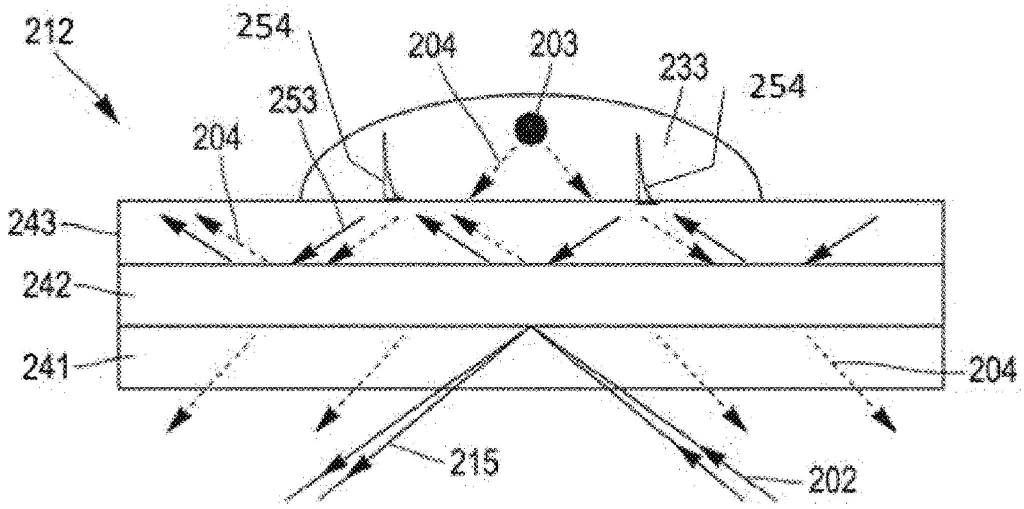
FIG. 5 is a view similar to FIG. 4, illustrating the scattering of light by a nanoparticle and in the resonant plate of the optical microscope of FIG. 2.
Figure 6:
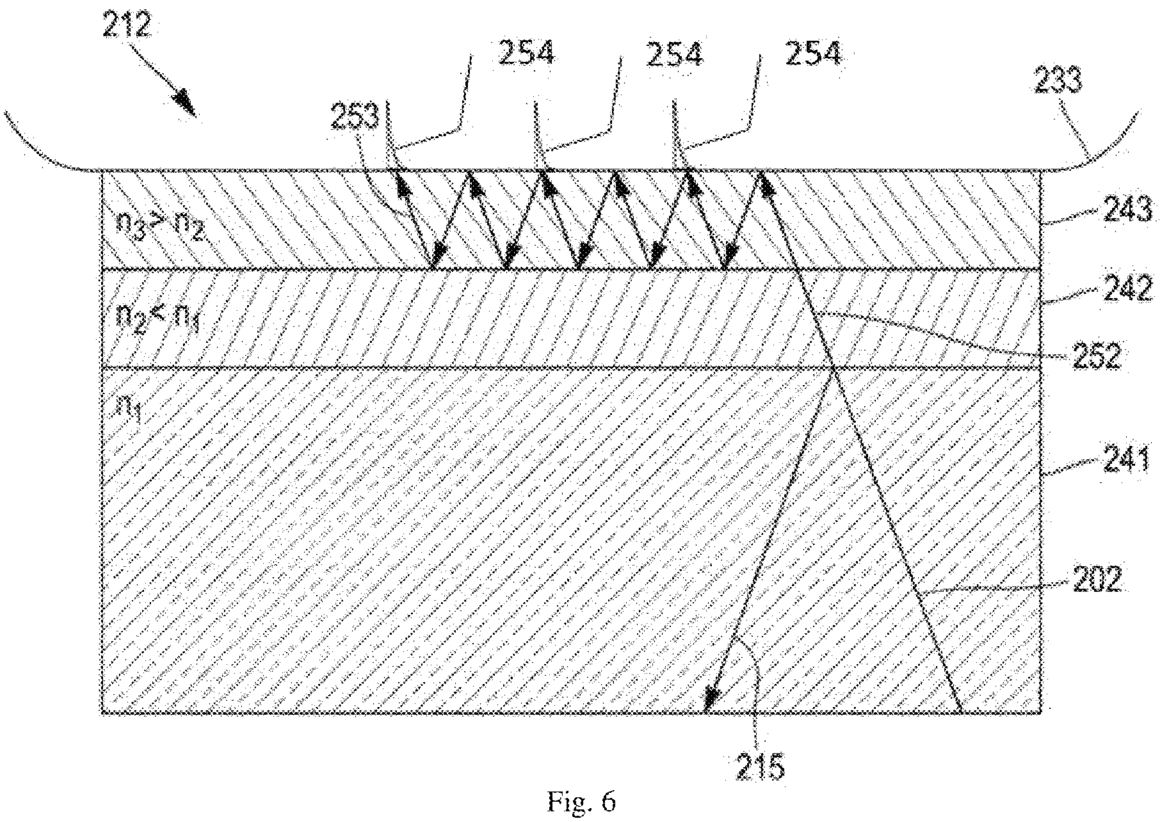
FIG. 6 is a schematic representation of the coupling of a light wave into the resonant plate of the optical microscope of FIG. 2.

With reference to FIGS. 4 to 6, three details of FIG. 3 are shown. FIG. 4 shows the microscope objective 205 and the resonant plate 212, and also the propagation of light in the resonant plate 212.

Of course, the arrows drawn in FIGS. 4 to 6 give a very schematic and partial representation of the propagation of the electromagnetic field. They are intended only to indicate a few significant directions of propagation and not dimensions of the light beams.

The microscope objective 205 is an oil-based objective, comprising an immersion oil 228 having an optical index identical to an optical index of glass. The resonant plate 212 is placed against the microscope objective 205, in contact with the immersion oil 228.

The resonant plate 212 is composed of a plurality of parallel layers arranged successively in a direction of the optical axis of the microscope. The resonant plate 212 comprises a glass plate 241, the glass plate 241 being in contact with the immersion oil 228.

A spacer 242 is placed adjacent to the glass plate 241. The spacer 242 has a smaller optical index than glass plate 241. According to one embodiment, the spacer 242 is composed of magnesium fluoride. According to one embodiment, a thickness of the spacer is 485 nanometers.

The spacer 242 is placed between the glass plate 241 and a waveguide 243. The spacer 242 has an optical index smaller than that of the waveguide 243. According to one embodiment, the waveguide 243 is made of titanium dioxide. According to one embodiment, the waveguide 243 has a thickness of 45 nanometers.

The waveguide 243 is in contact with the sample 233, in which one or more nanoparticles 203 are suspended.

With reference to FIG. 6, an optical index $n_1$ of the glass plate 241 is greater than an optical index $n_2$ of the spacer 242. Thus, there is a critical angle of an interface between the glass plate 241 and the spacer 242, which produces a total reflection.

With reference to FIG. 4, the incident laser beam 202 is focused on the Fourier plane at a critical distance from the optical axis of the microscope objective, the critical distance being such that the incident laser beam 202 is projected onto the resonant plate 212 with an angle of incidence greater than the aforementioned critical angle.

Thus, the incident laser beam 202 undergoes frustrated total reflection at the interface between the glass plate 241 and the spacer 242. The reflected laser beam 215 is projected toward the objective of the microscope 205 with the same angle of incidence and passes through the objective of the microscope 205.

An evanescent wave 252 penetrates the spacer 242. Since a thickness of the spacer 242 is chosen to be of the same order of magnitude as the decay length of the evanescent wave 252, the evanescent wave 252 is not totally attenuated at the interface between the spacer 242 and the waveguide 243. The thickness of the spacer 242 can be chosen so as to control the field enhancement in the waveguide 243. The thicker the spacer 242, the greater the enhancement.

With reference to FIG. 6, an optical index $n_3$ of the waveguide 243 being greater than an optical index of the spacer 242, the evanescent wave 252 coming from the spacer 242 is refracted in the waveguide 243 in the form of a guided wave 253.

The frequency of the incident laser beam 202 and the angle of incidence are configured so that the evanescent wave 252 resonantly excites a mode of the waveguide 243. For this purpose, a "phase matching" configuration is realized.

Because of the resonant excitation of the mode of the waveguide 243, an enhanced wave 254 then propagates in the sample 233 from the waveguide 243, with an amplitude that can be enhanced by a high enhancement factor, which can be as much as 1000, for example. The enhanced wave 254 propagates in the sample 233 and illuminates the nanoparticles 203.

With reference to FIG. 5, the nanoparticle 203 illuminated by the enhanced wave 254 emits scattered light 204 which propagates in the resonant plate 212 in the direction of the microscope objective (not shown). The dotted lines correspond to the scattered light 204 and the solid lines correspond to the incident laser beam 202, to the refracted beam in the form of a guided wave 253, to the reflected laser beam 215 and to the radiative losses of the guided wave 253 through the spacer 242.

Figure 7:
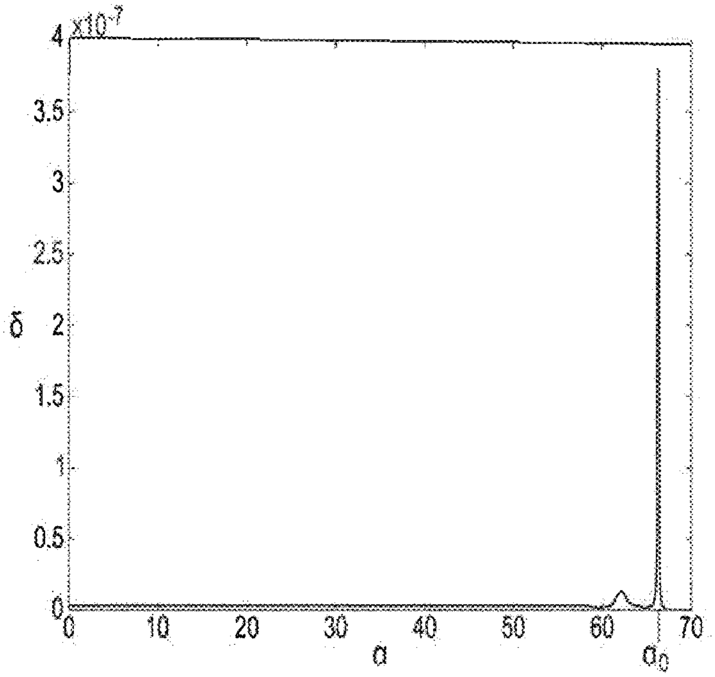
FIG. 7 is a graphical representation of an angular distribution of energy scattered by a nanoparticle.

With reference to FIG. 7, the energy density δ of the scattered light 204 has been represented on the ordinate as a function of the scattering angle α on the abscissa. The nanoparticle is located on the resonant plate 212. The wavelength used is 515 nm. The indices of the layers 241 to 243 are respectively n1=1.518, n2=1.38 and n3=2.8, and the thicknesses of the layers 242 and 243 are respectively 484 nm and 45 nm.

The scattering angle α is measured with respect to the optical axis in immersion oil 228. Due to the coupling of the scattered light 204 with resonant mode of the waveguide 243, a radiated power of the scattered light 204 in the direction of the microscope objective via the waveguide 243 escapes for the most part (about 50%) according to a predetermined scattering peak angle $\alpha_0$ at the output of the resonant plate, here at approximately 66° with respect to the optical axis. Thus, the scattered light 204 is a beam comprising a cone of maximum energy corresponding to the scattering peak angle $\alpha_0$.

Figure 8:
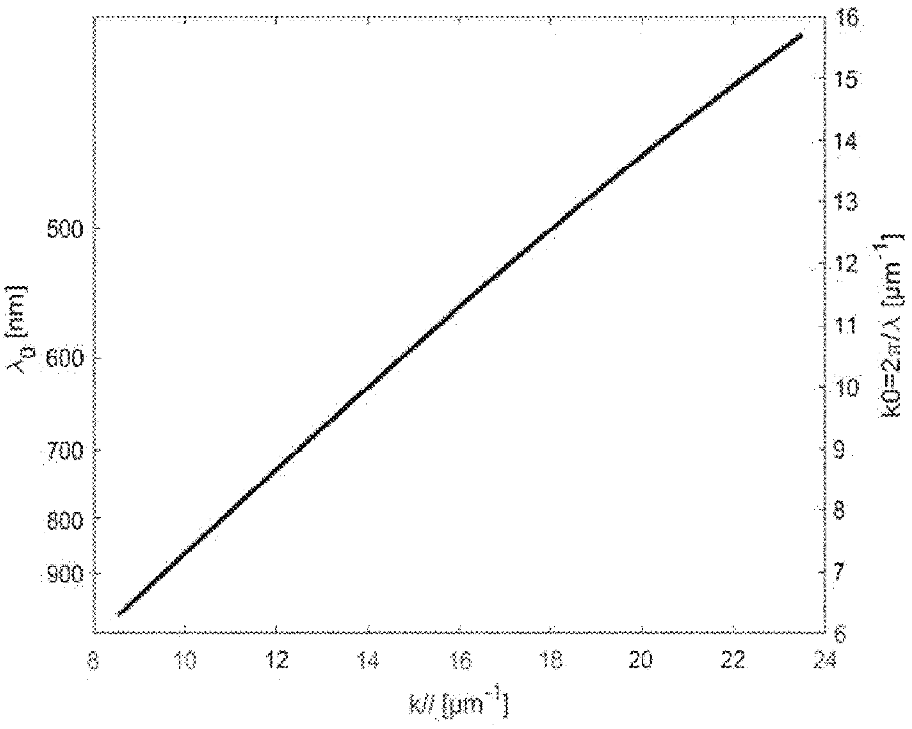
FIG. 8 is a graphical representation of the dispersion relationship of the resonant plate used in FIG. 7.

With reference to FIG. 8, a dispersion relationhip of the resonant plate 212 is shown, connecting a spatial wave vector in the resonant plate 212 with a wavelength of the incident laser beam 202. Thus, the resonant mode of the guided wave 253 will not be the same depending on the wavelength of the incident laser beam 202. Thus, the scattering peak angle $\alpha_0$ of the scattered light is also a function of the wavelength of the incident laser beam 202.

We now describe how the spatial filter 209 can take advantage of such an angular distribution of the energy scattered by the nanoparticle 203.

Since the Fourier plane of the objective 205 is imaged on the spatial filter 209 at the output of the first convergent exit lens 208 and of the second convergent exit lens 217, the angular distribution of the scattered light 204 is preserved on the spatial filter 209. In terms of the transverse component of the propagation wave vector, the cone of maximum energy corresponds substantially to a circle having a certain thickness, in other words to a ring.

Figure 9:
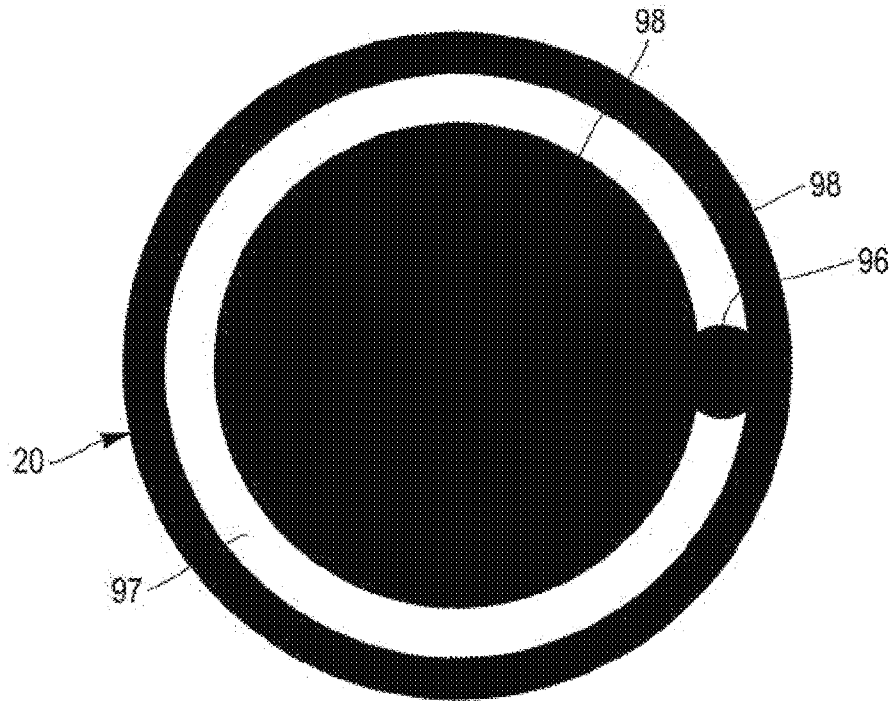
FIG. 9 is a representation of a spatial filter that can be used in the optical microscope according to a first variant working in dark field. The black part is opaque. The spatial filter allows the majority of the scattered light to pass through that is concentrated around an angle defined by the resonant plate and intersects the reflected beam.

Thus, the spatial filter 209 can be used, according to a first variant illustrated in FIG. 9, to transmit only a portion of the scattered light present in the circle of maximum energy.

A first filter 20 that can be used is shown in FIG. 9. The first filter 20 comprises a first mask 98 composed of two concentric portions and configured to define a transmission ring 97 configured to transmit only the scattered light corresponding to the maximum energy cone. Outside the transmission ring 97, the first mask 98 has a transmission coefficient that is preferably zero (total attenuation).

To form a dark-field filter, the first filter 20 can also comprise a second mask 96 positioned in the transmission ring 97 and configured to attenuate the reflected laser beam 215. Similarly, the second mask 96 has a transmission coefficient of preferably zero intensity (total attenuation), that is to say less than $10^{-6}$, for example.

Figure 10:
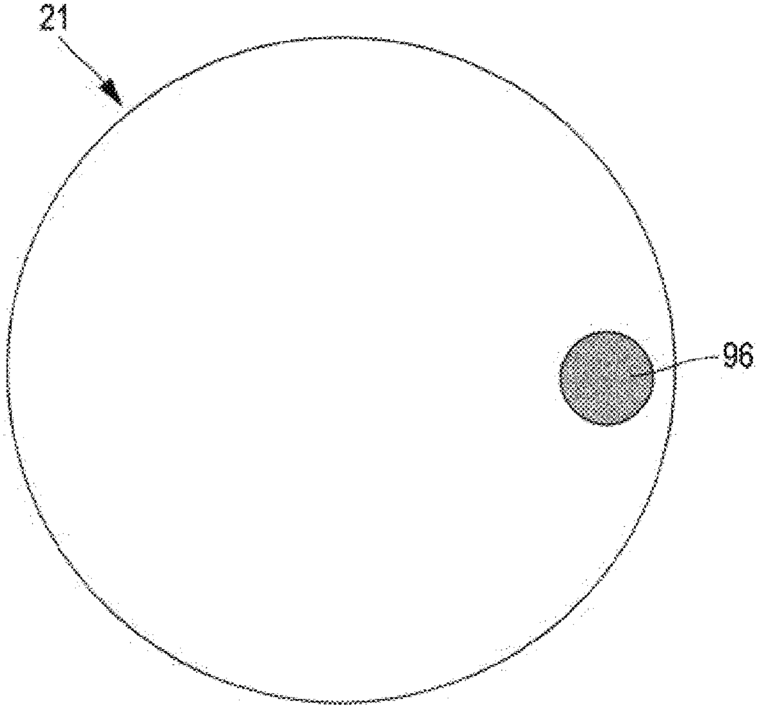
FIG. 10 is a representation of the spatial filter that can be used in the optical microscope with resonant plate according to a second variant making it possible to attenuate the reflected field in order to work in interferometric mode.
Figure 11:
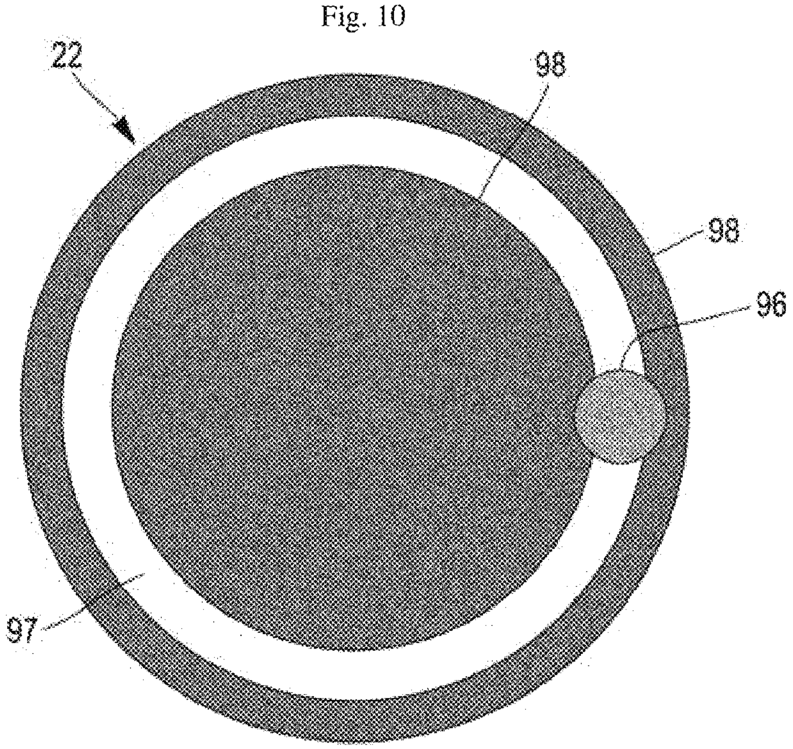
FIG. 11 is a representation of the spatial filter that can be used in the optical microscope with resonant plate according to a third variant making it possible to strongly attenuate the reflected beam and to separate the useful signal from the noise.

With reference to FIG. 10, a second filter 21 can be used. The second filter 21 comprises only the second mask 96 configured to attenuate the reflected beam 215, with attenuation that can be total or partial. All of the scattered light 204 is transmitted. If the intensity transmission coefficient of the second mask 96 is substantially zero, for example less than $10^{-6}$, the second filter 21 is a dark-field filter. If the transmission coefficient of the second mask 96 is non-zero, for example greater than $10^{-1}$, the second filter 21 is an interferometric bright-field filter. The optical microscope 200 is then used in an interferometric configuration With reference to FIG. 11, a second interferometric bright-field filter 22 is illustrated. The second interferometric bright-field filter 22 has a structure analogous to the dark-field filter 20. However, the second mask 96 here has a transmission coefficient that is not zero (partial attenuation), and preferably greater than the transmission coefficient of the first mask 98.

Figure 12:
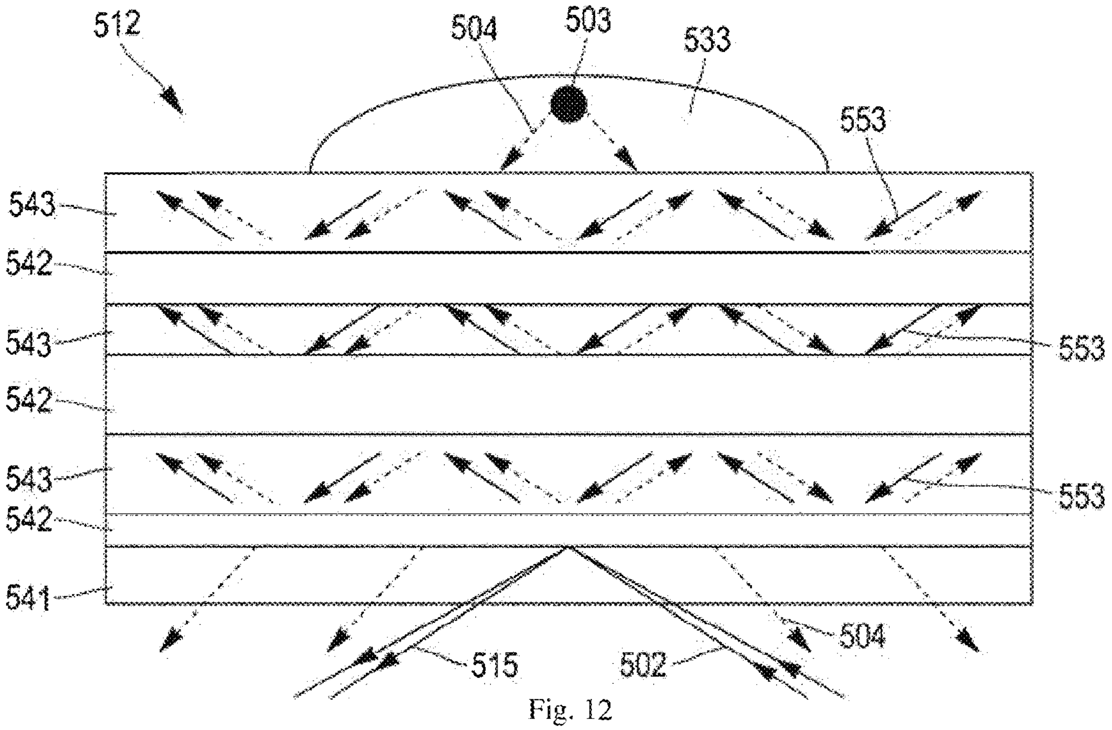
FIG. 12 is a representation of the resonant plate according to a first alternative using a set of dielectric layers.
Figure 13:
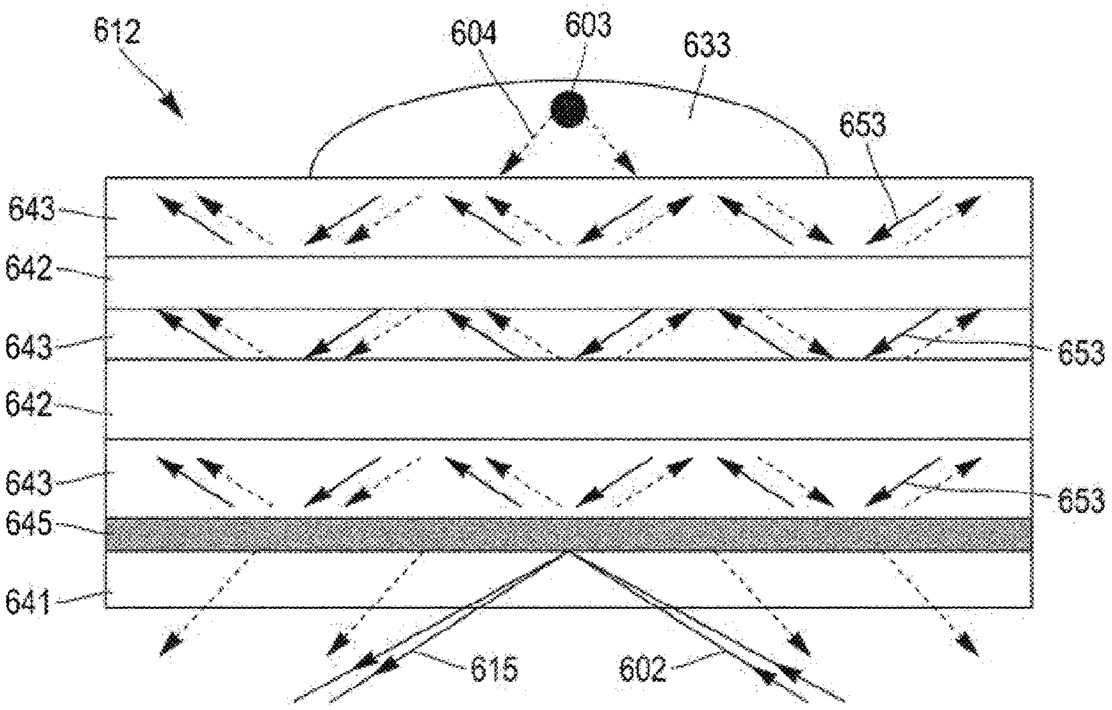
FIG. 13 is a representation of the resonant plate according to a second alternative using a mirror.

With reference to FIGS. 12 and 13, other embodiments of the resonant plate are presented.

With reference to FIG. 12, the elements analogous or identical to those of the second embodiment bear the same reference number increased by 300. FIG. 12 shows that it is possible to increase a number of layers in a resonant plate 512. In particular, it is possible to place alternately a plurality of spacers 542 and a plurality of waveguides 543. Evanescent waves propagate in the spacers 542.

The spacers 542 can have different thicknesses and/or different materials. The waveguides 543 can also have different thicknesses and/or different materials. Suitable thicknesses may typically be between 100 nm and 1 μm.

The plurality of waveguides 543 makes it possible to couple resonant modes to more values of the wavelength and angle of incidence of the incident laser beam 202. Thus, the optical microscope becomes more robust to variations in wavelength and angles of incidence of an incident laser beam 502.

Furthermore, the plurality of waveguides 543 makes it possible to increase an amplitude value of a resonant guided wave 553. Finally, the plurality of waveguides 543 allows the incident light beam 502 to excite several resonant modes simultaneously, which causes several angular peaks of energy of the scattered light 504 for the nanoparticle 503, with angular peaks of energy in a plurality of directions.

With reference to FIG. 13, the elements analogous or identical to those of the second embodiment bear the same reference number increased by 400. FIG. 13 shows that the resonant plate 612 can comprise a partially reflecting mirror 645. The mirror 645 can be a metal layer or a Bragg mirror and can accentuate a resonance phenomenon in the resonant plate 612. Evanescent waves propagate in the spacers 642.

FIGS. 12 and 13 show schematically a total reflection at the interface between the first layer 541 or 641 and the spacer 542 or 642. However, this position of the interface where frustrated total reflection takes place is not limiting. Other layers of materials can be inserted below the interface where frustrated total reflection takes place.

Figure 14:
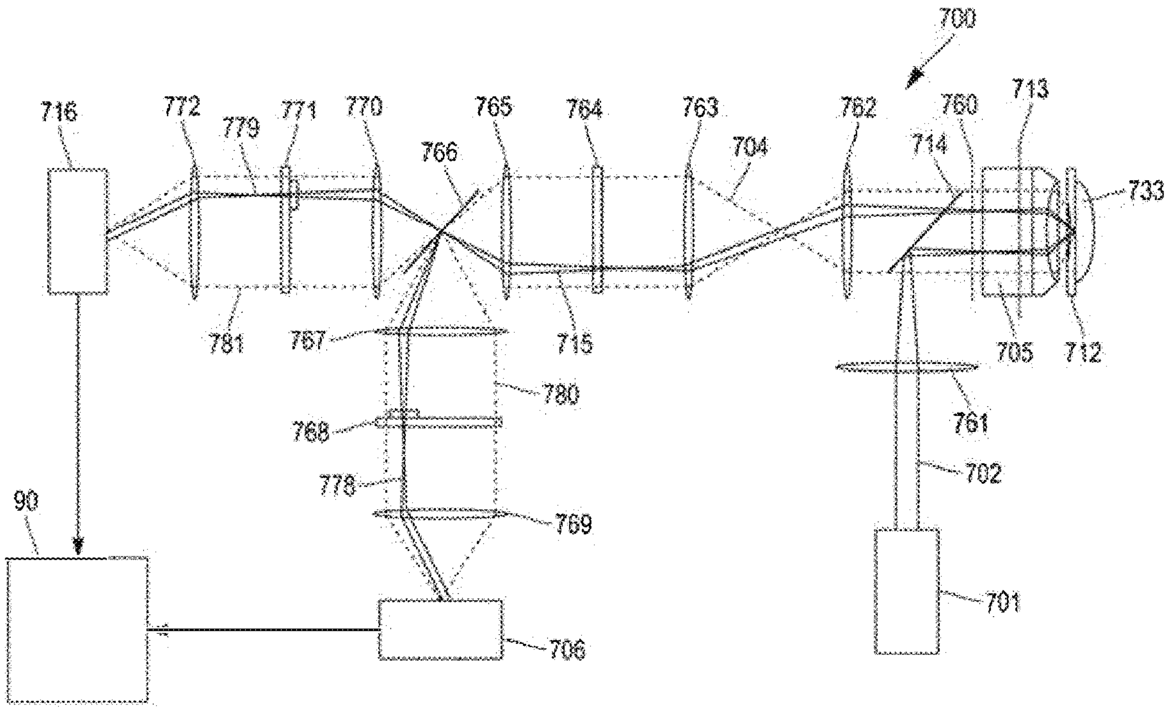
FIG. 14 is a representation of the optical microscope in reflection according to a third embodiment.

With reference to FIG. 14, the third embodiment of the optical microscope 700 comprising a resonant plate 712 can be used in an interferometric configuration using a balanced homodyne detection technique.

The light source 701 of the optical microscope 700 emits an incident laser beam 702, which passes through the convergent entrance lens, referred to here as the initial convergent lens 761, and is then reflected on the polarizing beam splitter plate 714 which is here a first polarizing beam splitter plate 714. The incident laser beam 702 is directed toward the microscope objective 705, passes through the resonant plate 712 and illuminates the sample 733 arranged on the support surface of the resonant plate.

The outgoing light beam comprises the scattered light 704 and a reflected beam 715, which pass through the microscope objective 705 and the first polarizing beam splitter plate 714.

The scattered light 704 and the reflected beam 715 pass through the convergent exit lens, which here constitutes a first common lens 762, a second common lens 763, a spatial filter 764 and a third common lens 765. The first common lens 762, the second common lens 763 and the third common lens 765 are convergent lenses.

A second beam splitter plate 766 is placed after the third common lens 765. The second splitter plate 766 separates firstly the reflected beam 715 into a first reflected beam 778 and a second reflected beam 779, and secondly the scattered light 704 into a first scattered light 780 and a second scattered light 781.

The first reflected beam 778 and the first scattered light 780 pass through an initial lens of first arm 767 and then a first phase mask 768. A final lens of first arm 769 focuses the first reflected beam 778 and the first scattered light 780 on a first camera 706.

The second reflected beam 779 and the second scattered light 781 pass through an initial lens of second arm 770 and a second phase mask 771. A final lens of second arm 772 focuses the second reflected beam 779 and the second scattered light 781 on a second camera 716.

The first phase mask 768, respectively the second phase mask 771, is configured to phase-shift the first reflected beam 778 with respect to the first scattered light 780, respectively the second reflected beam 779 with respect to the second scattered light 781, by a respective phase shift angle φ. According to one embodiment, the phase shift angle φ can be π/2 for the first phase mask 768 and −π/2 for the second phase mask 771.

A data processing system 90 can subtract a first intensity received by the first camera 706 and a second intensity received by the second camera 716, a difference between the first intensity and the second intensity being expressed as:

$$I_{det2} - I_{det1} = 4K\sqrt{T\ I_i\ I_s}\ \cos(\Delta\theta_2)$$

Such an expression makes it possible to keep only one interferometric term and to filter a reference signal.

Figure 15:
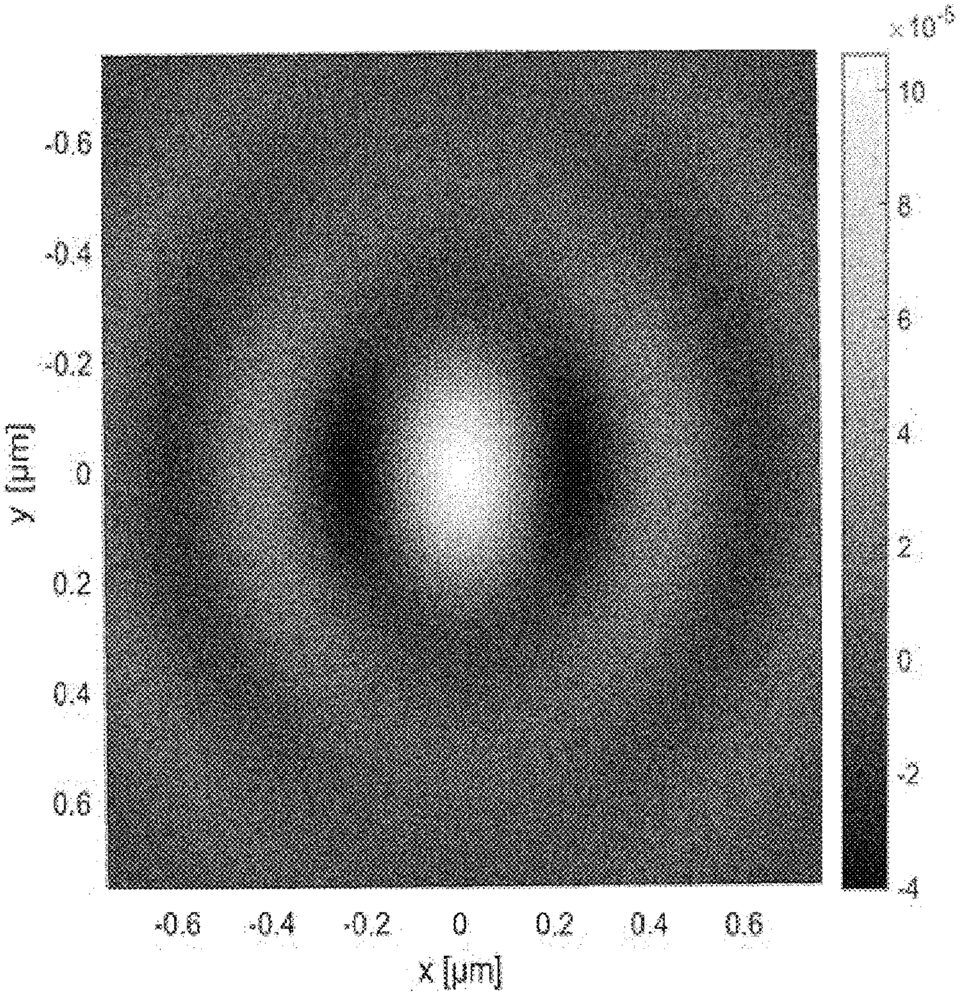
FIG. 15 is a graphical representation of results that can be obtained in a configuration from the prior art.
Figure 16:
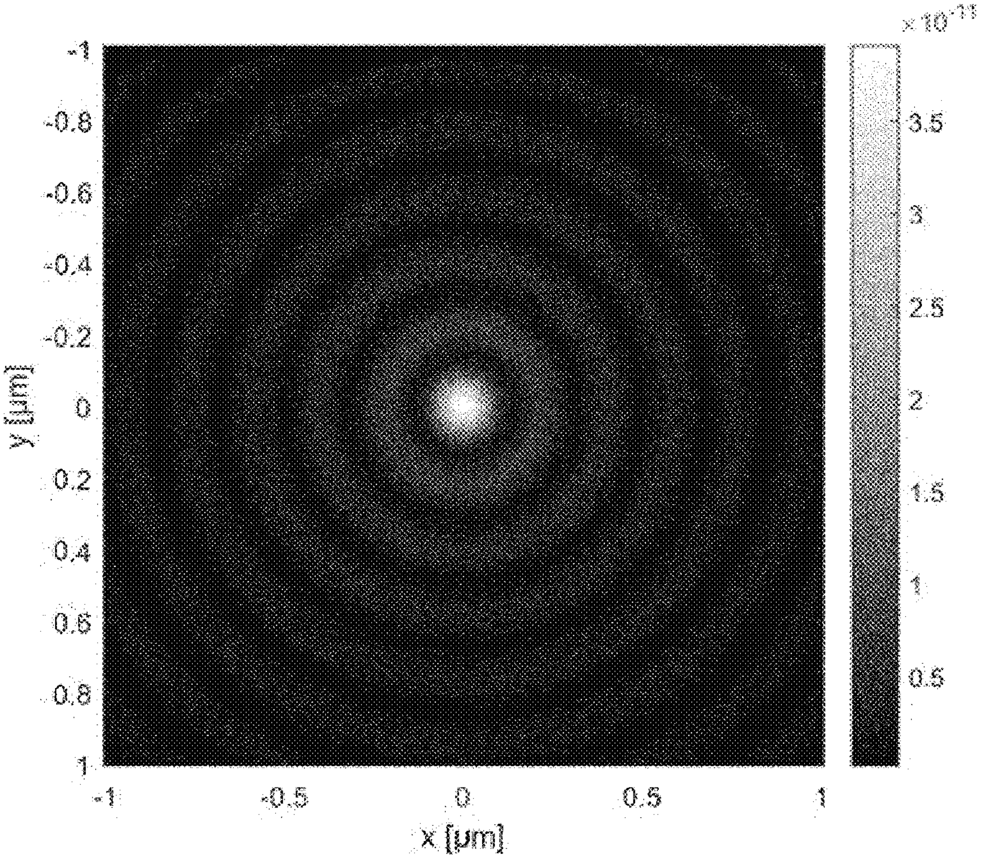
FIG. 16 is a graphical representation of results that can be obtained in a dark-field configuration of the optical microscope using the filter from FIG. 9.
Figure 17:
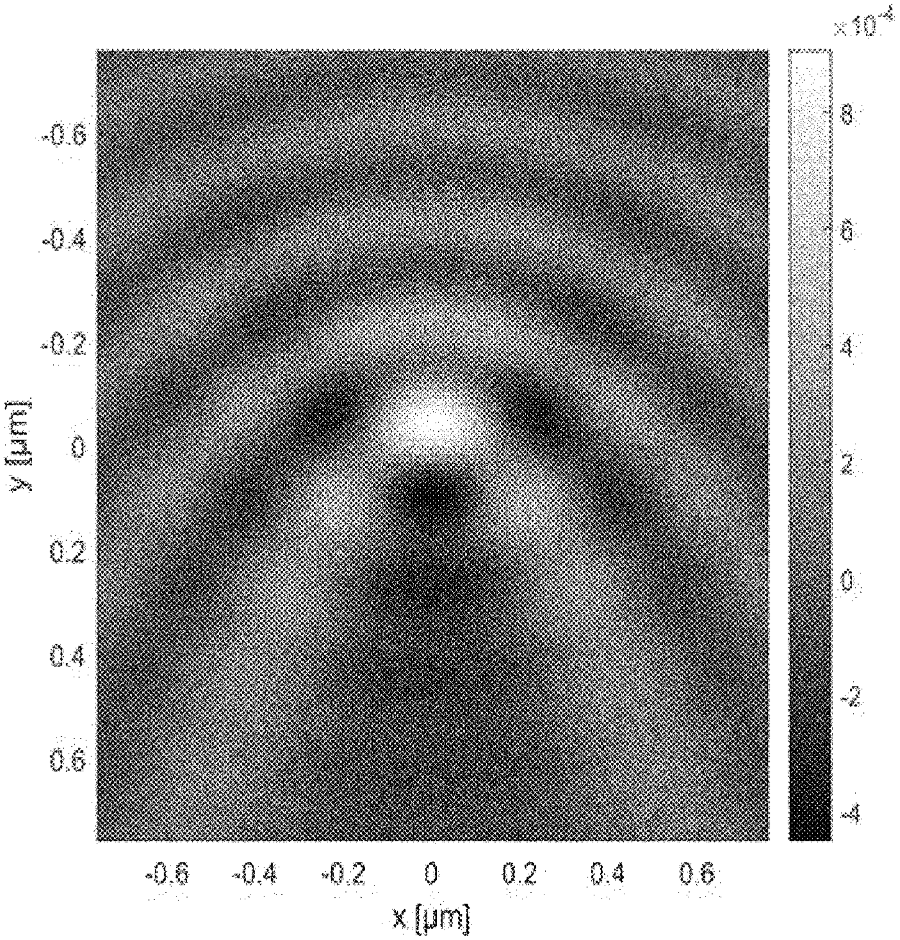
FIG. 17 is a graphical representation of results that can be obtained in an interferential configuration of the optical microscope using the filter from FIG. 10.
Figure 18:
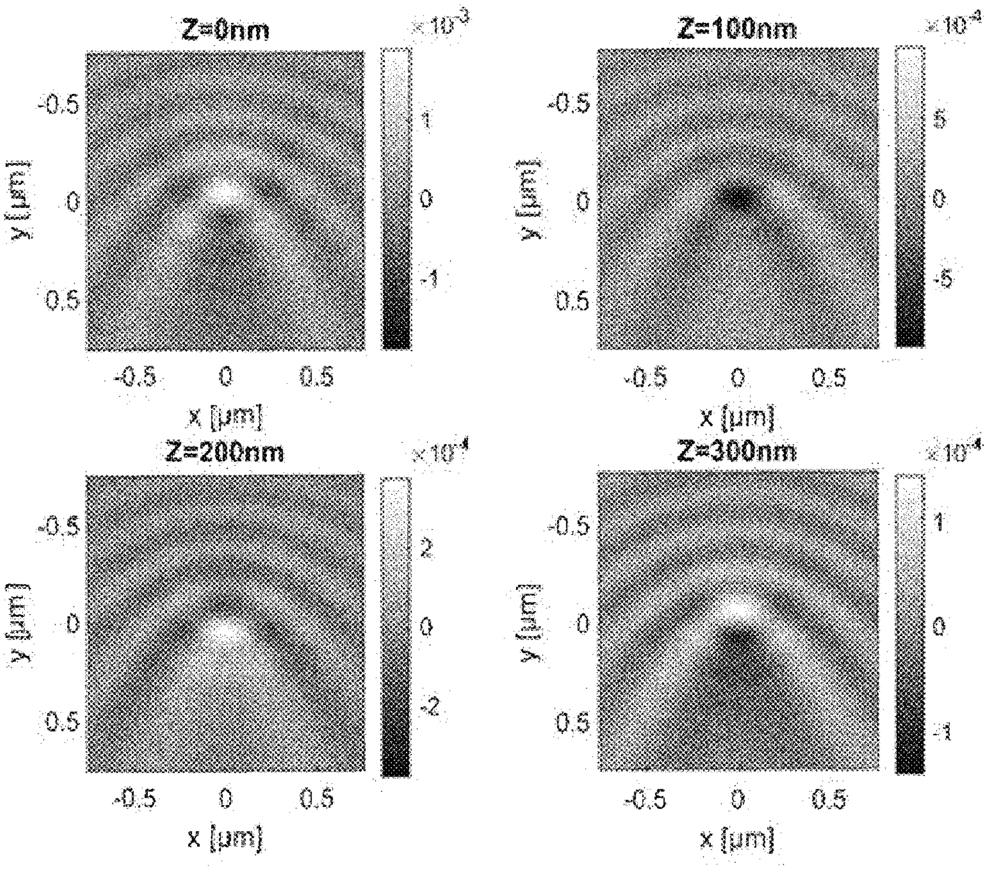
FIG. 18 is a set of graphical representations of results that can be obtained with different distance values between the nanoparticle and the resonant plate.

FIGS. 15 to 18 show graphical results obtained by numerical simulation. In FIGS. 15, 17 and 18, which show microscopy results in interferometric configuration, the color scale represents the contrast c as defined above.

In practice, the contrast c can be calculated or measured as c=I/I_ref where I denotes the intensity of a camera image and I_ref denotes the intensity of an average image (or reference image). The contrast image shown in FIGS. 15, 17 and 18 is obtained with a division that is done pixel by pixel.

FIG. 15 shows a comparative image obtained in a prior art microscope without resonant plate. A central spot at the center of the interference pattern corresponds to a detection of the nanoparticle.

FIGS. 16 to 17 show graphical results obtained by simulation in scenarios where the resonant plate is used.

FIG. 16 corresponds to a case where the dark-field filter 20 is used. In this figure, the grey scale represents relative intensities, black (0) corresponding to an effectively zero signal. A central spot corresponds to the nanoparticle. The central spot is sharper, circular and smaller in diameter than in FIG. 15, which indicates a gain in resolution.

FIG. 17 corresponds to a case where the interferometric filter 21 is used. The reflected laser beam 215 is then filtered and attenuated. FIG. 17 shows a central spot at the center of an interference pattern with more arcs than the comparative image. A central spot is nevertheless more easily distinguished than in the comparative image, which also indicates a gain in sensitivity.

The spatial filtering technique used, which is similar to rejecting all wave vectors except one, means that the image of a point is imaged in a series of circles. However, this does not prevent detection of an individual particle, even when the sample contains several particles, provided that the particles are spatially separated from one another in the sample.

Thus, independently of the filter used, a resonant plate makes it possible to increase the sensitivity of the optical microscope.

FIG. 18 shows a set of contrast images in which a distance Z measured along the optical axis between the resonant plate 212 and a nanoparticle 203 varies from image to image, as is indicated above each image. This example shows that variations in contrast and shape of the interference pattern can be exploited to evaluate a distance from the nanoparticle 203 to the resonant plate 212.

Image processing techniques can be implemented in order to achieve better detection. Several successive images can be recorded by the camera and then combined into a reference image. The reference image can be an average of the successive images.

The reference image can then be subtracted from a received image in order to filter out a reference signal and stationary noise.

In the case of a moving nanoparticle, for example suspended in a solution, two successive images can be subtracted in order to remove a background noise.

In addition, filters can be applied to the detected signal, for example a convolution filter. The convolution filter can be a Gaussian filter.

The contrast of the image of a particle detected in bright-field mode is proportional to the mass of the particle present in the sample. It is thus possible, by image processing, to carry out a quantitative measurement of this contrast and to deduce therefrom the mass of the particle, by comparison with a calibration signal, previously measured with particles of known mass. This technique is particularly effective for particles non-absorbent at the wavelength used, such as proteins in the visible spectrum.

The particles of known mass are chosen with an optical index very close to that of the particles to be characterized, for example of polymer material when the aim is to characterize organic material.

In the fourth embodiment of the optical microscope 800, shown in FIG. 19, the incident light beam 802 propagates through the sample 833: the nanoparticles scatter the light of the incident light beam 802.

If the particle is in the vicinity of the resonant plate 812, a portion of the scattered light is coupled to the guided mode.

Thus, a portion of the scattered light 804 is coupled to the guided mode of the resonant plate 812 and another portion is not coupled thereto. The outgoing scattered light 804 then comprises a first portion of scattered light having been coupled to the guided mode of the resonant plate 812 by particles placed in the vicinity of the plate, and a second portion of scattered light without coupling. The outgoing light beam is collected by the microscope objective 805 and propagates through a system of convergent lenses.

The scattered light 804 and the non-scattered portion 815 of the incident light beam pass through the convergent exit lens, which here constitutes a first convergent exit lens 808, a second convergent exit lens 817, a spatial filter 809 and a third convergent exit lens 818, before being collected by the optical detector, here a camera 806.

An image focal plane of the first convergent exit lens 808 corresponds to an object focal plane of the second convergent exit lens 817. The spatial filter 809 is placed in an image focal plane of the second convergent exit lens 817. It is placed in an image plane of the Fourier plane 813 of the microscope objective 805. Thus, the non-scattered portion 815 of the incident light beam is focused on the spatial filter 809 and can be blocked by the filter.

The third convergent exit lens 818 focuses the scattered light 804 onto the sensitive surface of the camera 806, which is placed in an image focal plane of the third convergent exit lens 218.

The filter 809 attenuates the non-scattered portion 815 of the outgoing light beam and the second portion of the scattered light. This filter 809 is, for example, similar to the filter 22 of FIG. 11. For example, it can be an interferometric bright-field filter with a structure similar to the filter 22 in FIG. 11, except that the second mask 96 which attenuates the illumination light is placed at the center of the filter. The second mask and the first mask 98 have different transmission coefficients, for example. The second mask has, for example, a transmission coefficient greater than that of the first mask.

As in the optical microscope 100, 200, 700 illuminating the sample in reflection, as is described in the first, second and third embodiments, about half of the energy scattered by each particle of the sample 833 is contained in the resonant mode of the resonant plate 812, thus in the first portion of the scattered light 804. The filter 809 largely filters the outgoing light beam so as to block as much as possible the non-scattered portion 815 of the incident light beam 802, without blocking the scattered light, in particular without blocking the first portion of the scattered light that has been coupled to the resonant mode of the resonant plate 812. This is made possible by the directional emission of the first portion of the scattered light having been coupled to the resonant mode of the resonant plate 812, as has been described with reference to the reflection embodiments of the optical microscope.

Advantageously, reducing the intensity of the incident light beam increases the contrast of the image of the sample formed on the camera sensor. This is also the case for the reflection optical microscope described above.

Unlike the embodiments of the optical microscope using reflection illumination of the sample, the incident light beam 802 illuminates the entire thickness of the sample 833 and not just the first hundreds of nanometers of sample in contact with the resonant plate, as was the case in the reflection configuration. Thus, in addition to the function described above, it is possible to use the optical microscope without the filter 809, in a configuration in which a larger volume of the sample is illuminated in order to detect slightly defocused particles. This is particularly useful for tracking the movement of scattering particles in the sample.

Thanks to the transmission configuration of the optical microscope 800, the outgoing light beam is free of back reflections of the incident light beam on the multiple lenses of the microscope objective 805. These back reflections are present in the reflection configuration and constitute a parasitic signal, in other words noise. Their elimination increases the signal-to-noise ratio of the detected image.

A transmission embodiment of the optical microscope with resonant plate has been described here. Obviously, other transmission embodiments can be envisioned, in particular a simplified transmission embodiment similar to the first reflection embodiment, in which the second and third convergent exit lenses are eliminated as well as the filter. It is also possible to envision a transmission embodiment of the optical microscope used in an interferometric configuration using a technique of balanced homodyne detection in which the outgoing light beam travels on an optical path at the exit of the resonant plate similar to the path traveled by the outgoing light beam after the first polarizing beasm splitter plate in the third reflection embodiment described above.

Although the disclosure has been described in conjunction with several particular embodiments, it is obvious that it is in no way limited thereto and that it comprises all the technical equivalents of the means described as well as their combinations if these fall within the scope of the disclosure.

The use of the verb "comprise" or "include" and its conjugated forms does not exclude the presence of elements or steps other than those set out in a claim.

In the claims, any reference sign in parentheses cannot be construed as a limitation of the claim.

The invention claimed is:

1. An optical microscope, comprising:

a light source emitting illumination light adapted to illuminate a sample to be imaged;

an optical device comprising a microscope objective;

a resonator including, successively in a direction of an optical axis of the microscope objective, at least one first layer having a first optical index, at least one spacer layer having a second optical index, and at least one waveguide layer having a third optical index, the second optical index being less than the first optical index and the third optical index, the resonator having a support surface facing away from the optical device and intended to receive the sample; and an optical detector, wherein the optical device is arranged to collect light exiting the resonator and to direct the outgoing light from the resonator to the optical detector in order to form an image of the sample on the optical detector, the outgoing light includes light scattered by the sample and a non-scattered portion of the illumination light.

2. The optical microscope of claim 1, wherein the optical device comprises an amplitude filter arranged between the microscope objective and the optical detector, and is configured to apply a first selective attenuation to the non-scattered portion of the illumination light.

3. The optical microscope of claim 2, wherein an intensity transmission coefficient associated with the first selective attenuation is less than $10^{-6}$.

4. The optical microscope of claim 3, wherein the light scattered by the sample includes a first portion of scattered light from resonantly excited mode(s) and a second portion of scattered light, the amplitude filter being configured to apply a second selective attenuation to the second portion of scattered light.

5. The optical microscope of claim 4, wherein an intensity transmission coefficient associated with the second selective attenuation is less than $10^{-6}$.

6. The optical microscope of claim 4, wherein the intensity transmission coefficient associated with the first attenuation is greater than the intensity transmission coefficient associated with the second attenuation.

7. The optical microscope of claim 2, wherein the optical device includes two convergent lenses arranged to image a Fourier plane of the microscope objective on the amplitude filter.

8. The optical microscope of claim 1, wherein the illumination light is a laser beam.

9. The optical microscope of claim 1, wherein the optical device includes at least one convergent lens through which the outgoing light passes, the convergent lens being configured to image an object plane of the microscope objective on the optical detector.

10. The optical microscope of claim 1, further comprising an image processing system, the image processing system being configured to record a plurality of images detected by the optical detector at successive times, combine the plurality of images into a reference image, and process at least one image detected by the optical detector with the reference image so as to suppress static signals.

11. The optical microscope of claim 1, further comprising an image processing system, the image processing system being configured to determine a contrast in an image detected by the optical detector, and determine at least one parameter of a particle contained in the sample as a function of the contrast, the parameter being selected from the group consisting of a mass of the particle and a position of the particle in the direction of the optical axis.

12. The optical microscope of claim 1, wherein the light source and the optical device are arranged to illuminate the sample placed on the support surface of the resonator in reflection.

13. The optical microscope of claim 12, wherein the optical device receives the illumination light in order to direct the illumination light onto the sample, and the microscope objective of the optical device being is configured to direct the illumination light onto the resonator at an angle of incidence greater than a critical angle of an interface between the first layer and the spacer layer, such that the illumination light resonantly excites at least one mode in the waveguide layer and illuminates the sample with an enhanced evanescent wave.

14. The optical microscope of claim 12, wherein the optical device comprises a polarizing beam splitter plate, the polarizing beam splitter plate reflecting the illumination light toward the microscope objective and being traversed by the outgoing light.

15. The optical microscope of claim 1, wherein the optical detector is a first optical detector and further comprising a second optical detector, the optical device comprising a non-polarizing beam splitter plate, the non-polarizing beam splitter plate receiving the outgoing light and splitting the outgoing light into a first portion of outgoing light directed toward the first detector and a second portion of outgoing light directed toward the second detector, the first portion of outgoing light comprising a first portion of reflected light and a first portion of scattered light, a phase mask being arranged to be traversed by the first portion of outgoing light, the phase mask-being configured to apply a phase shift between the first portion of reflected light and the first portion of scattered light.

16. The optical microscope of claim 15, wherein the phase mask is a first phase mask, the optical device further including a second phase mask arranged to be traversed by the second portion of outgoing light, the second portion of outgoing light comprising a second portion of reflected light and a second portion of scattered light, the second phase mask being configured to apply a phase shift between the second portion of reflected light and the second portion of scattered light, the first phase mask and the second phase mask having different phase properties.

17. The optical microscope of claim 1, wherein the optical device includes an optical condenser receiving the illumination light exiting the light source, the optical condenser being configured to focus the illumination light in a Fourier plane of the microscope objective onto a zone remote from the optical axis of the microscope objective in order to produce an angle of incidence.

18. The optical microscope of claim 1, wherein the resonator is arranged between the microscope objective and the light source along the optical axis of the microscope objective, so that the light source is adapted to illuminate the sample received by the support surface of the resonator in transmission.

* * * * *